US006998052B2

(12) United States Patent
Horwitz et al.

(10) Patent No.: US 6,998,052 B2
(45) **Date of Patent: *Feb. 14, 2006**

(54) MULTICOLUMN SELECTIVITY INVERSION GENERATOR FOR PRODUCTION OF ULTRAPURE RADIONUCLIDES

(75) Inventors: E. Philip Horwitz, Naperville, IL (US); Andrew H. Bond, Hoffman Estates, IL (US)

(73) Assignee: PG Research Foundation, Darien, IL (US)

( * ) Notice: Subject to any disclaimer, the term of this patent is extended or adjusted under 35 U.S.C. 154(b) by 185 days.

This patent is subject to a terminal disclaimer.

(21) Appl. No.: 10/409,829

(22) Filed: Apr. 9, 2003

(65) Prior Publication Data

US 2003/0219366 A1 Nov. 27, 2003

Related U.S. Application Data

(60) Provisional application No. 60/372,327, filed on Apr. 12, 2002.

(51) Int. Cl.
*B01D 11/02* (2006.01)

(52) U.S. Cl. ...................... 210/638; 210/663; 210/682; 423/6; 423/8

(58) Field of Classification Search ................ 210/634, 210/635, 638, 656, 660, 663, 669, 682, 688; 424/1.11; 423/2, 3, 6, 8, 21.1, 21.5
See application file for complete search history.

(56) References Cited

U.S. PATENT DOCUMENTS

| | | | | |
|---|---|---|---|---|
| 3,785,990 | A | | 1/1974 | Benjamins et al. |
| 3,970,583 | A | | 7/1976 | Panek-Finda |
| 4,206,358 | A | | 6/1980 | Matthews et al. |
| 4,387,303 | A | | 6/1983 | Benjamins |
| 4,472,299 | A | | 9/1984 | Weisner et al. |
| 4,783,305 | A | | 11/1988 | Forrest |
| 4,833,329 | A | | 5/1989 | Quint et al. |
| 4,859,431 | A | | 8/1989 | Ehrhardt |
| 4,876,232 | A | * | 10/1989 | Barkatt ....................... 502/417 |
| 4,990,787 | A | | 2/1991 | Vanderheyden et al. |
| 5,109,160 | A | | 4/1992 | Evers |
| 5,154,897 | A | | 10/1992 | Ehrhardt et al. |
| 5,186,913 | A | | 2/1993 | Knapp, Jr. et al. |
| 5,275,802 | A | | 1/1994 | Knapp, Jr. et al. |
| 5,281,631 | A | | 1/1994 | Horwitz et al. |
| 5,368,736 | A | | 11/1994 | Horwitz et al. |
| 5,382,388 | A | | 1/1995 | Ehrhardt et al. |
| 5,409,677 | A | | 4/1995 | Zinn |
| 5,449,462 | A | | 9/1995 | Horwitz et al. |
| 5,539,003 | A | | 7/1996 | Horwitz et al. |

(Continued)

OTHER PUBLICATIONS

Adelstein et al. Eds., *Isotopes for Medicine and the Life Sciences*, National Academy Press: Washington, D.C. 1995, pp. v-vii and 1-8.

(Continued)

*Primary Examiner*—Joseph Drodge
(74) *Attorney, Agent, or Firm*—Welsh & Katz, Ltd.

(57) ABSTRACT

A multicolumn selectivity inversion generator separation method has been developed in which a desired daughter radionuclide is selectively extracted from a solution of the parent and daughter radionuclides by a primary separation column, stripped, and passed through a second guard column that retains any parent or other daughter impurities, while the desired daughter elutes. This separation method minimizes the effects of radiation damage to the separation material and permits the reliable production of radionuclides of high chemical and radionuclidic purity for use in diagnostic or therapeutic nuclear medicine.

20 Claims, 6 Drawing Sheets

U.S. PATENT DOCUMENTS

| | | | | |
|---|---|---|---|---|
| 5,603,834 | A | 2/1997 | Rogers et al. | |
| 5,618,851 | A | 4/1997 | Trochimcznk et al. | |
| 5,651,883 | A | 7/1997 | Horwitz et al. | |
| 5,707,525 | A | 1/1998 | Rogers et al. | |
| 5,729,821 | A | 3/1998 | Knapp et al. | |
| 5,809,394 | A | 9/1998 | Bray et al. | |
| 5,851,401 | A | 12/1998 | Horwitz et al. | |
| 5,854,968 | A | 12/1998 | Horwitz et al. | |
| 5,863,439 | A | 1/1999 | Dietz et al. | |
| 5,888,397 | A | 3/1999 | Rogers et al. | |
| 6,511,603 | B1 | 1/2003 | Dietz et al. | |
| 6,770,195 | B2 * | 8/2004 | Young et al. | 210/198.2 |
| 6,787,042 | B2 | 9/2004 | Bond et al. | |
| 2003/0194364 | A1 * | 10/2003 | Bond et al. | |

OTHER PUBLICATIONS

Ali et al., "Production Techniques o", *Radiochimica Acta* (1987) 41:65-72.

Bond, et al., "Nuclear Separations for Radiopharmacy: The Need for Improved Separations to Meet Future Research and Clinical Demands", *Ind. Eng. Chem. Research*, (2000) 39: 3130-3134.

Boyd, "Molybdenum-99: Technetium-99m Generator", *Radiochimica Acta* (1982) 30:123-145.

Boyd, "Technetium Generators: Status and Prospects", *Radiochimica Acta* (1987) 41:59-63.

Bremer, "Large-Scale Production and Distribution of Tc-99m Generators for Medical Use", *Radiochimica Acta* (1987) 41:73-81.

Choppin et al., *Nuclear Chemistry: Theory and Applications*, Pergamon Press: Oxford 1980, pp. 310-312.

Diamond, et al., "Resin Selectivity in Dilute to Concentrated Aqueous Solutions" Chapter 8 in *Ion Exchange: A Series of Advances*, vol. I, J.A. Marinsky, ed., Marcel Dekker, Inc. (Buffalo, New York: 1966) pp. 277-351.

Dietz, et al., "Improved Chemistry for the Production of Yttrium-90 for Medical Applications", *Appl. Radiat. Isol.* (1992) 43:1093-1101.

Dietz, et al., "Extraction Chromatography: Progress and Opportunities", Chapter 6 in *Metal-Ion Separation and Preconcentration: Progress and Opportunities*, Bond et al., Eds., American Chemical Society (Washington, D.C.: 1999), 716:234-250.

Gansow, et al., "Generator-Produced Bi-212: Chelated to Chmically Modified Monoclonal Antibody for Use in Radiotherapy", Chapter 15 in *Radionuclide Generators: New Systems for Nuclear Medicine Applications*F.F. Knapp, Jr. and T.A. Butler, eds., American Chemical Society (Washington, D.C.: 1984), pp. 215-227.

Hassfjell et al., "The Development of the α-Particle Emitting Radionuclides $^{212}Bi$ and $^{213}Bi$, and Their Decay Related Radionuclides, for Therapeutic Applications", *Chem. Rev.* (2001) 101:2019-2036.

Horwitz et al., "Separation and Preconcentration of Strontium from Biological, Environmental, and Nuclear Waste Samples by Extraction Chromatography Using a Crown Ether", *Anal. Chem.* (1991) 63:522-525.

Horwitz et al., "A Novel Strontium-Selective Extraction Chromatographic Resin", *Solvent Extraction and Ion Exchange* (1992) 10(2):313-336.

Horwitz et al., "A Lead-Selective Extraction Chromatographic Resin and Its Application to the Isolation of Lead from Geological Samples", *Analytica Chimica Acta* (1994) 292:263-273.

Horwitz, et al., "DIPEX: A new extraction chromatographic material for the separation and preconcentration of actinides from aqueous solution", *React. Funct. Polymers.* 33:25-36 (1997).

IMAM, "Advancements in Cancer Therapy with Alpha-Emitters: A Review", *Int. J. Radiation Oncology Biol. Phys.* (2001) 51(1):271-278.

Lambrecht et al., "Radionuclide Generators", *Radiochimica Acta* (1997) 77:103-123.

McDevitt et al., "Tumor Therapy with Targeted Atomic Nanogenerators", *Science* (Nov. 2001) 294:1537-1540.

Mirzadeh, "Generator-Produced Alpha-Emitters", *Appl. Radiat. Isot.* (1998) 49(4):345-349.

Mirzadeh, et al., "Biomedical Radioisotope Generator Systems", *J. Radioanal. Nucl. Chem.* (1996) 203:471-488.

Molinski, "A Review of $^{99m}Tc$ Generator Technology", *Int. J. Appl. Radiat. Isol*(1982) 33:811-819.

Munze et al., "Tc-Generators and Kits", *Radiochimica Acta* (1987) 41:97-101.

Schwochau, "Technetium Radiopharmaceuticals-Fundamentals, Synthesis, Structure, and Development", *Angew. Chem. Int. Ed. Engl.* (1994) 33:2258-2267.

Sekine, et al., *Solvent Extraction Chemistry*, Marcel Kekker (New York: 1977).

Wagner et al., "Expert Panel: Forecast Future Demand for Medical Isotopes", Department of Energy, Office of Nuclear Energy, Science, and Technology 1999.

Whitlock et al., "Radionuclide Therapy for the Treatment of Microscopic Ovarian Carcinoma: An Overview", *Ind. Eng. Chem. Res.* (2000) 39:3135-3139.

Wu, et al., "An Improved Generator for the Production of $^{213}Bi$ and $^{225}Ac$", *Radiochem. Acta.* (1997) 79:141-144.

* cited by examiner

MULTICOLUMN SELECTIVITY INVERSION GENERATOR FOR PRODUCTION OF ULTRAPURE RADIONUCLIDES

CROSS-REFERENCE TO RELATED APPLICATION

This application claims priority to provisional application Ser. No. 60/372,327, filed on Apr. 12, 2002 and to applications Ser. No. 10/159,003, filed May 31, 2002, Ser. No. 10/261,031 filed, Sep. 30, 2002 and application Ser. No. 10/351,717, filed Jan. 27, 2003.

BACKGROUND ART

The use of radioactive materials in diagnostic medicine has been readily accepted because these procedures are safe, minimally invasive, cost effective, and they provide unique structural and/or functional information that is otherwise unavailable to the clinician. The utility of nuclear medicine is reflected by the more than 13 million diagnostic procedures that are performed each year in the U.S. alone, which translates to approximately one of every four admitted hospital patients receiving a nuclear medical procedure. [See, Adelstein et al. Eds., *Isotopes for Medicine and the Life Sciences*; National Academy Press, Washington, D.C. (1995); Wagner et al., "Expert Panel: Forecast Future Demand for Medical Isotopes," Department of Energy, Office of Nuclear Energy, Science, and Technology (1999); Bond et al., *Ind. Eng. Chem. Res.* (2000) 39:3130–3134.] More than 90 percent of these procedures are for diagnostic imaging purposes and use technetium-99m ($^{99m}$Tc) as the radionuclide. $^{99m}$Tc possesses a unique combination of convenient production and availability, coupled with appropriate nuclear decay mode, decay energy, and chemical reactivity. These properties enable $^{99m}$Tc to be coupled to biolocalization agents that permit the imaging of many diseases and virtually every part of the human anatomy. [See, Bremer, *Radiochim. Acta* (1987) 41:73–81; Steigman et al., *The Chemistry of Technetium in Medicine*, National Academy Press: Washington, D.C., (1992); Schwochau, *Angew. Chem. Int. Ed. Eng.* (1994) 33:2258–2267.]

The typical life cycle of a medical radionuclide, such as $^{99m}$Tc, commencing with raw material acquisition and proceeding through nucleogenesis of a radiochemical and clinical administration of the purified and sterile radiopharmaceutical is depicted schematically in FIG. 1. Technetium-99m is used as a specific example in this discussion because the vast majority of all nuclear medical procedures utilize this radionuclide, and aspects of new production technologies are typically compared to this successful model. The $^{99m}$Tc desired "daughter" is formed by $\beta^{1-}$ (or negatron) decay of the molybdenum-99 ($^{99}$Mo) "parent", which forms as a result of the fission of uranium-235 in a nuclear reactor. [See, Bremer, *Radiochim. Acta* (1987) 41:73–81; Schwochau, *Angew. Chem. Int. Ed. Eng.* (1994) 33:2258–2267; Boyd, *Radiochim. Acta* (1987) 41:59–63; and Ali et al., *Radiochim. Acta* (1987) 41:65–72.]

Molybdenum-99 is separated from its nucleosynthesis precursors and byproducts during "Chemical Processing", which represents the last stage as a "Radiochemical" according to FIG. 1. Such "Radiochemicals" encounter far less stringent regulation of the chemical and radionuclidic purity and no biological requirements (e.g., sterility and nonpyrogenicity) are enforced. Upon completion of "Chemical Processing", which includes generator fabrication, the $^{99}$Mo/$^{99m}$Tc pair has become a "Radiopharmaceutical" (according to FIG. 1) and is now subject to rigorous control of the chemical purity, radionuclidic purity, sterility, and nonpyrogenicity.

Chemical purity is vital to a safe and efficient medical procedure, because the radionuclide is generally conjugated to a biolocalization agent prior to use. This conjugation reaction relies on the principles of coordination chemistry wherein a radionuclide is chelated to a ligand that is covalently attached to the biolocalization agent. In a chemically impure sample, the presence of ionic impurities can interfere with this conjugation reaction. If sufficient $^{99m}$Tc, for example, is not coupled to a given biolocalization agent, poorly defined images are obtained due to insufficient photon density localized at the target site and/or from an elevated in vivo background due to a specific distribution in the blood pool or surrounding tissues.

Regulation of radionuclidic purity stems from the hazards associated with the introduction of long-lived or high energy radioactive impurities into a patient, especially if the biolocalization and body clearance characteristics of the radioactive impurities are unknown. Radionuclidic impurities pose the greatest threat to patient welfare, and such interferents are the primary focus of clinical quality control measures that attempt to prevent the administration of harmful and potentially fatal doses of radiation to the patient.

In addition to the controls placed on the chemical and radionuclidic purity of a "Radiopharmaceutical", FIG. 1 also indicates that biological requirements are instituted. The internal administration of radiopharmaceuticals obviously mandates that the pharmaceutical be sterile and nonpyrogenic, and such requirements are familiar to medical practitioners.

Complementing the favorable nuclear and chemical characteristics of $^{99m}$Tc are favorable economics and the convenience with which this radionuclide can be produced to meet radiopharmaceutical specifications. Taken together, these factors have been vital to the success of nuclear medicine.

The chemistry underlying the separation of $^{99m}$Tc from $^{99}$Mo relies on the high affinity of alumina ($Al_2O_3$) for molybdate-99 ($^{99}MoO_4^{2-}$) and its negligible affinity for pertechnetate-99m ($^{99m}TcO_4^{1-}$) in physiological saline solution. FIG. 2 shows a conventional $^{99m}$Tc generator or "$^{99m}$Tc cow", in which the $^{99}MoO_4^{2-}$ parent is immobilized on an $Al_2O_3$ sorbent from which the $^{99m}TcO_4^{1-}$ can be conveniently separated by ascending elution of a physiological saline solution into a vacuum container. [See, Bremer, *Radiochim. Acta* (1987) 41:73–81; Schwochau, *Angew. Chem. Int. Ed. Eng.* (1994) 33:2258–2267; Boyd, *Radiochim. Acta* (1982) 30:123–145; and Molinski, *Int. J. Appl. Radiat. Isot.* (1982) 33:811–819.]

The above "conventional generator" affords $^{99m}TcO_4^{1-}$ of adequate chemical and radionuclidic purity for use in patients and has the benefits of ease of use, compact size, and the safety of having the principal radiologic hazard (i.e., $^{99}MoO_4^{2-}$) immobilized on a solid $Al_2O_3$ support. The latter benefit eases restrictions on transport of the generator to the nuclear pharmacy and simplifies manual processing by the nuclear medicine technician.

Given the preeminent position of $^{99m}$Tc in nuclear medicine and the simple and effective operation of the conventional $^{99m}$Tc generator shown in FIG. 2, the logic and design of this radionuclide generator have become the industry standard for nuclear medicine. This generator methodology is not, however, universally acceptable for all radionuclides, especially for those having low specific activity parent sources or those radionuclides proposed for use in therapeutic nuclear medicine. The difficulties of using the conventional generator technology with low specific activity parent radionuclides; that is, the microquantities of the parent radioisotope present as a mixture with macroquantities of the nonradioactive parent isotope(s), derive from the need to distribute macroquantities of parent isotopes over a large volume of support so as not to exceed the sorbent capacity. Large chromatographic columns are not practical for nuclear medical applications as the desired daughter radionuclide is recovered in a large volume of eluate and, as such, is not suitable for clinical use without secondary concentration. Radionuclides useful in therapeutic nuclear medicine represent unique challenges to the conventional generator technology and warrant further discussion.

The use of radiation in disease treatment has long been practiced, with the mainstay external beam radiation therapy now giving way to more targeted delivery mechanisms. By example, sealed-source implants containing palladium-103 or iodine-125 are used in the brachytherapeutic treatment of prostate cancer; samarium-153 or rhenium-188 conjugated to diphosphonate-based biolocalization agents concentrate at metastasis in the palliative treatment of bone cancer pain; and radioimmunotherapy (RIT) employs radionuclide conjugation to peptides, proteins, or antibodies that selectively concentrate at the disease site whereby radioactive decay imparts cytotoxic effects. Radioimmunotherapy represents the most selective means of delivering a cytotoxic dose of radiation to diseased cells while sparing healthy tissue. [See, Whitlock, *Ind. Eng. Chem. Res.* (2000), 39:3135–3139; Hassfjell et al., *Chem. Rev.* (2001) 101:2019–2036; Imam, *J. Radiation Oncology Biol. Phys.* (2001) 51:271–278; and McDevitt et al., *Science* (2001) 294:1537–1540.] In addition, the recent explosion of information about disease genesis and function arising from the human genome project is expected to propel RIT into a leading treatment for micrometastatic carcinoma (e.g., lymphomas and leukemias) and small- to medium-sized tumors.

Candidate radionuclides for RIT typically have radioactive half-lives in the range of 30 minutes to several days, coordination chemistry that permits attachment to biolocalization agents, and a comparatively high linear energy transfer (LET). The LET is defined as the energy deposited in matter per unit pathlength of a charged particle, [see, Choppin et al., *J. Nuclear Chemistry: Theory and Applications*; Pergamon Press: Oxford, 1980] and the LET of α-particles is substantially greater than β-particles.

By example, α-particles having a mean energy in the 5–9 MeV range typically expend their energy within about 50–90 μm in tissue, which corresponds to several cell diameters. The lower LET $\beta^{1-}$-particles having energies of about 0.5–2.5 MeV may travel up to 10,000 μm in tissue, and the low LET of these $\beta^{1-}$-emissions requires as many as 100,000 decays at the cell surface to afford a 99.99 percent cell-kill probability. For a single α-particle at the cellular surface, however, the considerably higher LET provides a 20–40% probability of inducing cell death as the lone α-particle traverses the nucleus. [See, Hassfjell et al., *Chem. Rev.* (2001) 101:2019–2036.]

Unfortunately, the LET that makes α- and $\beta^{1-}$-emitting nuclides potent cytotoxic agents for cancer therapy also introduces many unique challenges into the production and purification of these radionuclides for use in medical applications. Foremost among these challenges is the radiolytic degradation of the support material that occurs when the conventional generator methodology of FIG. 2 is used with high LET radionuclides. [See, Hassfjell et al., *Chem. Rev.* (2001) 101:2019–2036; Gansow et al., In *Radionuclide Generators: New Systems for Nuclear Medicine Applications*; Knapp et al. Eds., American Chemical Society: Washington, D.C. (1984) pp 215–227; Knapp, et al. Eds., *Radionuclide Generators: New Systems for Nuclear Medicine Applications* American Chemical Society: Washington, D.C. (1984) Vol. 241; Dietz et al., *Appl. Radiat. Isot.* (1992) 43:1093– 1101; Mirzadeh et al., *J. Radioanal. Nucl. Chem.* (1996) 203:471–488; Lambrecht et al., *Radiochim. Acta* (1997) 77:103–123; and Wu et al., *Radiochim. Acta* (1997) 79:141–144.]

Radiolytic degradation of the generator support material can result in: (a) diminished chemical purity (e.g., radiolysis products from the support matrix can contaminate the daughter solution); (b) compromised radionuclidic purity (e.g., the support material can release parent radionuclides to the eluate: termed "breakthrough"); (c) diminished yields of daughter radionuclides (e.g., α-recoil can force the parent radionuclides into stagnant regions of the support making their decay products less accessible to the stripping eluent); (d) decreases in column flow rates (e.g., fragmentation of the support matrix creates particulates that increase the pressure drop across the column); and (e) erratic performance (e.g., variability in product purity, nonreproducible yields, fluctuating flow rates, etc.).

Medical radionuclide generators typically employ three fundamental classes of sorbents for use in the conventional methodology depicted in FIG. 2: (a) organic sorbents (e.g., polystyrene-divinylbenzene copolymer-based ion-exchange resins, polyacrylate supports for extraction chromatography, and the like), (b) inorganic sorbents (e.g., $Al_2O_3$, inorganic gels, and the like) and (c) hybrid sorbents (e.g., inorganic frameworks containing surface-grafted organic chelating or ion-exchange functionalities, silica supports used in extraction chromatography, and the like).

A variety of organic sorbents, most notably the conventional cation- and anion-exchange resins, have been proposed for use in nuclear medicine generators [see, Molinski et al., *Int. J. Appl. Radiat. Isot.* (1982) 33:811–819; Gansow et al., in *Radionuclide Generators: New Systems for Nuclear Medicine Applications*, Knapp et al. Eds., American Chemical Society, Washington, D.C. (1984) pp 215–227; Mirzadeh et al., *J. Radioanal. Nucl. Chem.* (1996) 203:471–488; and Lambrecht et al., *Radiochim. Acta* (1997) 77:103–123] due to the well documented chemical selectivity [see, Diamond et al., In *Ion Exchange*, Marinsky Ed., Marcel Dekker, New York (1966) Vol. 1, p 277; and Massart, "Nuclear Science Series, Radiochemical Techniques: Cation-Exchange Techniques in Radiochemistry," NAS-NS 3113; National Academy of Sciences (1971)] and the widespread availability of these materials. Unfortunately, organic-based ion-exchange resins frequently fail or are severely limited in applications using the conventional generator logic, and typically do so at radiation levels far below those needed for routine human use.

By example, polystyrene-divinylbenzene copolymer-based cation-exchange resins are used in a generator for the α-emitter $^{212}Bi$, but such materials are limited to approximately two week "duty cycles" (i.e., the useful generator lifetime accounting for chemical and physical degradation) for 10–20 mCi generators. Radiolytic degradation of the chromatographic support reportedly leads to diminished flow rates, reduced $^{212}Bi$ yields, and breakthrough of the radium-224 ($^{224}Ra$) parent. [See, Mirzadeh et al., *J. Radioanal. Nucl. Chem.* (1996) 203:471–488.] Similarly, a $^{213}Bi$ generator employing an organic cation-exchange resin was limited to a shelf life of approximately one week at an activity level of 2–3 mCi of the α-emitting $^{225}Ac$ parent. [See, Mirzadeh et al., *J. Radioanal. Nucl. Chem.* (1996) 203:471–488; and Lambrecht et al., *Radiochim. Acta* (1997) 77:103–123.]

With the US Food and Drug Administration's recent approval of yttrium-90 ($^{90}Y$)-based RIT for widespread human use, more efficient generator technologies for this radionuclide continue to emerge. Yttrium-90 forms by $\beta^{1-}$ decay of the strontium-90 ($^{90}Sr$) parent radionuclide and, thus, represents a two component separation involving Sr(II) and Y(III) (presuming a chemically pure $^{90}Sr$ stock). Although a variety of $^{90}Y$ production methods have been proposed, [see, Dietz et al., *Appl. Radiat. Isot.* (1992) 43:1093–1101; Horwitz et al., U.S. Pat. No. 5,368,736 (1994); and Ehrhardt et al., U.S. Pat. No. 5,154,897 (1992)] each technology is challenged by scale-up to Curie levels of production due to problems arising from radiolysis of the solution medium and the support matrix. The inadequacies of the solvent extraction and ion exchange-based generators for $^{90}Y$ have been briefly reviewed in works proposing macrocyclic host/guest chemistry as the basis for the separation of $^{90}Y$ from $^{90}Sr$. [See, Dietz et al., *Appl. Radiat. Isot.* (1992) 43:1093–1101; and Ehrhardt et al., U.S. Pat. No. 5,154,897 (1992).]

In these reports, the $^{90}Sr$ was separated from $^{90}Y$ in 3 M $HNO_3$ on a Sr(II) selective chromatographic support containing a lipophilic crown ether. This extraction chromatographic material showed exceptional stability to γ radiation from a $^{60}Co$ source, although some diminution of Sr(II) retention was noted. Unfortunately, the presence of radiolysis-induced gas pockets adversely affects the chromatographic performance of this conventional generator. Consequently, the $^{90}Sr$ was stripped after each processing run to minimize radiolytic degradation of the support; however, it became increasingly difficult to achieve efficient stripping of $^{90}Sr$ upon repeated use.

The use of inorganic materials in radionuclide generators has been greatly influenced by the $Al_2O_3$-based conventional $^{99m}Tc$ generator technology. [See, Bremer, *Radiochim. Acta* (1987) 41:73–81; Schwochau, *Angew. Chem. Int. Ed. Eng.* (1994) 33:2258–2267; Boyd, *Radiochim. Acta* (1987) 41:59–63; Boyd, *Radiochim. Acta* (1982) 30:123–145; Molinski, *Int. J. Appl. Radiat. Isot.* (1982) 33:811–819; Benjamins et al., U.S. Pat. No. 3,785,990 (1974); Panek-Finda et al., U.S. Pat. No. 3,970,583 (1976); Matthews et al., U.S. Pat. No. 4,206,358 (1980); Benjamins et al., U.S. Pat. No. 4,387,303 (1983); Weisner et al., U.S. Pat. No. 4,472,299 (1984); Monze et al., *Radiochim. Acta* (1987) 41:97–101; Forrest, U.S. Pat. No. 4,783,305 (1988); Quint et al., U.S. Pat. No. 4,833,329 (1989); Vanderheyden et al., U.S. Pat. No. 4,990,787 (1991); Evers et al., U.S. Pat. No. 5,109,160 (1992); Ehrhardt et al., U.S. Pat. No. 5,382,388 (1995); and Knapp et al., U.S. Pat. No. 5,729,821 (1998).] Although the inorganic sorbents represent an improvement with respect to radiolytic stability, such inorganic materials frequently exhibit poor ion selectivity, slow partitioning kinetics, and poorly defined morphologies that inhibit good chromatographic performance.

Using the $^{99m}Tc$ generator example, a two component separation (i.e., $^{99m}TcO_4^{1-}$ from $^{99}MoO_4^{2-}$ in physiological saline solution) is required, for which $Al_2O_3$ is well suited. For more complicated parent daughter relationships, however, several very different chemical species can appear between the parent and daughter in a given decay chain (e.g., a gas, a tetravalent cation, and a divalent cation separate $^{224}Ra$ and $^{212}Bi$) and identifying a single inorganic sorbent capable of retaining all but the desired daughter radionuclide is difficult.

Rhenium-188 ($^{188}Re$) is receiving attention as a therapeutic nuclide for the prevention of restenosis after angioplasty, for pain palliation of bone cancer, and in certain RIT procedures given the similarity of its coordination chemistry with that of its widely studied lighter congener Tc. Rhenium-188 is formed by $\beta^{1-}$ decay of tungsten-188 ($^{188}W$), which is produced by double neutron capture of enriched $^{186}W$ in a high flux nuclear reactor. Inefficiencies arising in the nucleosynthesis of $^{188}W$ result in a low specific activity parent; that is, trace $^{188}W$ is present in macroquantities of the $^{186}W$ isotope. Such a mass of tungstate ($WO_4^{2-}$) requires a large column so that the capacity of $Al_2O_3$ for $WO_4^{2-}$ is not exceeded. Large chromatographic columns yield the $^{188}Re$ daughter in large volumes of solution, and a variety of secondary concentration procedures have been devised to address this shortcoming. [See, Knapp et al. Eds., *Radionuclide Generators: New Systems for Nuclear Medicine Applications*, American Chemical Society: Washington, D.C. (1984) Vol. 241; Mirzadeh et al., *J. Radioanal. Nucl. Chem.* (1996) 203:471–488; Lambrecht, et al., *Radiochim. Acta* (1997) 77:103–123; Knapp et al., U.S. Pat. No. 5,729,821 (1998); Knapp et al., U.S. Pat. No. 5,186,913 (1993); and Knapp et al., U.S. Pat. No. 5,275,802 (1994).]

Another seldom discussed shortcoming of the conventional generator methodology as applied to $^{188}Re$ arises after the generator has concluded its duty cycle and the isotopically enriched $^{186}W$ must be extracted from the bulk $Al_2O_3$ matrix. Recovery of the isotopically enriched $^{186}W$ for further neutron irradiation is an important part of the economical production and use of $^{188}Re$, but the distribution of macroquantities of isotopically enriched $^{186}W$ target materials over a large volume of $Al_2O_3$ inhibits cost effective processing.

The $^{188}Re$ "gel generator" attempts to overcome some of the challenges faced by the inorganic $Al_2O_3$-based $^{188}Re$ generator, and is based on the formation of a highly insoluble zirconyl tungstate [$ZrO(WO_4)$] gel. [See, Ehrhardt et al., U.S. Pat. No. 5,382,388 (1995) and Ehrhardt et al., U.S. Pat. No. 4,859,431 (1989).] This concept has several advantages over $Al_2O_3$-based generators, but still suffers from the fundamental drawbacks of applying the conventional generator methodology to therapeutic radionuclides.

Although the $ZrO(WO_4)$ gel generator for $^{188}Re$ can permit the use of smaller column volumes than the $Al_2O_3$-based generators, the recovery of valuable isotopically enriched $^{186}W$ for subsequent irradiation is still complicated. Additional considerations include variable chromatographic behavior and flow rates, as the precipitated $ZrO(WO_4)$ solids are not of well defined particle sizes or morphologies.

The inorganic materials discussed here are not immune to radiolytic degradation, especially with the high LET radionuclides. Several early versions of the α-emitting $^{212}Bi$ generator [see, Gansow et al., in *Radionuclide Generators: New Systems for Nuclear Medicine Applications*; Knapp et al. Eds., American Chemical Society: Washington, D.C. (1984) pp 215–227; and Mirzadeh, S. Generator-Produced Alpha-Emitters. *Appl. Radiat. Isot.* (1998) 49:345–349] used inorganic titanates to retain the long-lived thorium-228 parent, from which the $^{224}Ra$ daughter elutes and is subsequently sorbed onto a conventional cation-exchange resin. Over time, the titanate column material succumbed to radiolytic degradation, creating fine particulates that forced separations to be performed at elevated pressures.

The hybrid sorbents can be subdivided into extraction chromatographic materials and engineered inorganic ion-exchange materials. Most of the published applications of hybrid materials have used well-known extraction chromatographic methods [see, Dietz et al., in *Metal Ion Separation and Preconcentration: Progress and Opportunities*; Bond et al. Eds., American Chemical Society, Washington, D.C. (1999) Vol. 716, pp 234–250], whereas the preparation and use of engineered inorganic materials is a more recent phenomenon. Extraction chromatography overcomes the poor ion selectivity and slow partitioning kinetics of inorganic materials by using solvent extraction reagents physisorbed to an inert chromatographic substrate. [See, Dietz et al., in *Metal Ion Separation and Preconcentration: Progress and Opportunities*; Bond et al. Eds., American Chemical Society, Washington, D.C. (1999) Vol. 716, pp 234–250.]

The radiolytic stability of extraction chromatographic supports is improved when the inert substrate is an amorphous inorganic material such as silica, with the most profound results reflected as sustainable flow rates over the generator duty cycle. Such "improved" radiolytic stability is deceptive, however, as the fundamental chemical reactions underlying the parent/daughter separation still involve molecules constructed from an organic framework that remains susceptible to radiolytic degradation. Likewise, organic-based chelating moieties have been introduced into engineered inorganic ion-exchange materials to improve ion selectivity, but such functionalities continue to suffer the effects of radiolysis.

Preliminary reports using hybrid sorbents as conventional generator supports in the production of $^{213}Bi$ have appeared. [See, Lambrecht et al., *Radiochim. Acta* (1997) 77:103–123; Wu et al., *Radiochim. Acta* (1997) 79:141–144; and Horwitz et al., U.S. Pat. No. 5,854,968 (1998).] Initial investigations have relied on sorption of $^{225}Ra$ by organic cation-exchange resins, which showed substantial degradation over a short period of time giving reduced yields of $^{213}Bi$, poor radionuclidic purity, and unacceptably slow column flow rates. [See, Mirzadeh et al., *J. Radioanal. Nucl. Chem.* (1996) 203:471–488; and Lambrecht, et al., *Radiochim. Acta* (1997) 77:103–123.] Initial improvements centered on sorption of the $^{225}Ac$ parent of $^{213}Bi$ on Dipex® Resin, an inert silica gel-based support to which a chelating diphosphonic acid diester is physisorbed. [Horwitz et al., *React. Funct. Polymers* (1997) 33:25–36.] The silica substrate exhibits greater radiolytic stability than the previously employed organic cation-exchange resins; however, radiolytic damage (i.e., discoloration) was observed surrounding the narrow chromatographic band in which the $^{225}Ac$ parent is loaded, ultimately leading to breakthrough of the $^{225}Ac$ parent. [See, Lambrecht et al., *Radiochim. Acta* (1997) 77:103–123; and Wu et al., *Radiochim. Acta* (1997) 79:141–144.]

An incremental improvement in this generator centered on reducing the radiation density by dispersing the $^{225}Ac$ parent radioactivity over a larger volume of the chromatographic support, which is achieved by loading the Dipex® Resin with $^{225}Ac$ in a batch mode rather than in a narrow chromatographic band. [See, Wu et al., *Radiochim. Acta* (1997) 79:141–144.] Unfortunately, this batch loading process is awkward and the Dipex® Resin still suffers from radiolytic degradation of the chelating diphosphonic acid diester upon which the separation efficiency relies.

Despite industry preferences for the conventional generator depicted in FIG. 2, the fundamental limitations discussed above are compounded by radiolytic degradation of the support medium when using high levels of the high LET radioactivity useful in therapeutic nuclear medicine. The severity of these limitations coupled with the ultimate liability of compromised patient safety argue for the development of alternative generator technologies, especially for therapeutically useful radionuclides.

An ideal generator technology should provide operational simplicity and convenience as well as reliable production of the theoretical yield of the desired daughter radionuclide having high chemical and radionuclidic purity. As deployed for diagnostic radionuclides, the conventional generator technology generally meets these criteria, although purity and yield have been observed to fluctuate. [See, Boyd, *Radiochim. Acta* (1982) 30:123–145; and Molinski, *Int. J. Appl. Radiat. Isot.* (1982) 33:811–819.]

The conventional generator is poorly suited, however, to systems involving low specific activity parents (e.g., the $^{188}W/^{188}Re$ generator discussed above) as well as with the high LET radionuclides useful in therapeutic nuclear medicine. In order to safely and reliably produce therapeutically useful radionuclides of high chemical and radionuclidic purity, a new paradigm in radionuclide generator technology is required. A shift in the fundamental principles governing generator technologies for nuclear medicine, and for therapeutic nuclides specifically, is supported by the fact that the inadvertent administration of the long-lived parents of high LET therapeutic radionuclides would compromise the patient's already fragile health; potentially resulting in death. Because the conventional generator strategy depicted in FIG. 2 relies on long-term storage of the parent radionuclide on a solid support that is constantly subjected to high LET radiation, no assurances can be made regarding the chemical and radionuclidic purity of the daughter radionuclide over an approximate 14–60 day generator duty cycle.

Additional support for fundamental changes in radionuclide generator technology derives from the rapidly increasing trend towards automation of routine tasks such as synthesis operations in biotechnology and high throughput blood screening in the clinical laboratory. Radionuclide generator technologies, as practiced in the nuclear pharmacies, presently lag behind in the automation of routine activities. In the nuclear medicine arena, increasing federal regulations safeguarding patient health and business competition/profitability are likely to drive the industry towards automation. The introduction of computer-controlled liquid delivery systems into the nuclear pharmacy will permit a departure from the vacuum container-based generators of FIG. 2. A reduction in the number of manual operations also serves to minimize the radiation dose to the nuclear medicine technician, while simultaneously reducing the liabilities attributable to human error.

The adverse effects of radiolytic degradation described above pose enormous challenges in the development of new therapeutic radionuclide generators. Any damage to the support material of a conventional generator compromises the separation efficiency, potentially resulting in breakthrough of the parent radionuclides and to a potentially fatal dose of radiation if administered to the patient. Such a catastrophic event is theoretically prevented by the quality control measures integrated into nuclear pharmacy operations, but any lack of safe, predictable generator behavior represents a major liability to the nuclear pharmacy, hospital, and their respective shareholders. The invention described hereinafter provides an alternative radionuclide generator technology that is capable of reliably producing near theoretical yields of medically useful radionuclides of high chemical and radionuclidic purity.

BRIEF DESCRIPTION OF THE INVENTION

The present invention contemplates a method for producing a solution of a desired daughter radionuclide that is substantially free of impurities. That method comprises the steps of contacting an aqueous parent-daughter radionuclide solution containing a desired daughter radionuclide with a first separation medium having a high affinity for the desired daughter radionuclide and a low affinity for the parent and other daughter radionuclides. The parent and desired daughter radionuclides have one or both of different ionic charges or different charge densities or both as they are present in that solution. That contact is maintained for a time period sufficient for the desired daughter radionuclide to be bound by the first separation medium to form desired daughter-laden separation medium and a solution having a lessened concentration of desired daughter radionuclide (compared to the initial parent-daughter radionuclide solution).

The solution having a lessened concentration of desired daughter radionuclide is removed from the desired daughter-laden separation medium. The desired daughter radionuclide is stripped from the desired daughter-laden separation medium to form a solution of desired daughter radionuclide. The solution of desired daughter radionuclide is contacted with a second separation medium having a high affinity for the parent radionuclide and a low affinity for the desired daughter radionuclide. In preferred embodiments, no chemical adjustment is made to the solution before elution on the second separation medium (guard column). That contact is maintained for a time period sufficient for parent radionuclide, if present, to be bound by the second separation medium to form a solution of substantially impurity-free desired daughter radionuclide. The solution of substantially impurity-free daughter radionuclide is typically recovered, although that solution can be used without recovery for a reaction such as binding of the radionuclide to a medically useful agent.

The present invention has several benefits and advantages.

In one benefit, the method does not require the use of air or gas to separate some of the solutions from one another, which in turn provides better chromatographic operating performance and better overall chemical and radionuclidic purity.

An advantage of a contemplated method is that the separation media have longer useful lifetimes because they tend not to be degraded by radiation due to the relatively little time spent by high linear energy transfer radionuclides in contact with the media.

Another benefit of the invention is that radionuclides having high purity can be obtained.

Another advantage of the invention is that greater latitude in the selection of commercially available pairs of separation media are available, and appropriate elution solutions are easily prepared for the production of different radionuclides for medical and analytical applications.

A still further benefit of the invention is that the high separation efficiency of the separation media permits daughter radionuclides to be recovered in a small volume of eluate solution.

A still further advantage of the invention is that the chemical integrity of the separation medium is preserved, which provides a more predictable separation performance and reduces the likelihood of parent radionuclide contamination of the daughter product.

Still further benefits and advantages will be readily apparent to the skilled worker from the disclosures that follow.

BRIEF DESCRIPTION OF THE DRAWINGS

In the drawings forming a portion of this disclosure.

DETAILED DESCRIPTION OF PREFERRED EMBODIMENTS

An answer to the problems posed by radiolytic degradation when using high LET radionuclides is found in the present invention that separates parent and desired daughter radionuclides from a solution containing both using a method that is broadly referred to herein as multicolumn selectivity inversion. The term "parent radionuclide" is often used in the singular herein for convenience with the understanding that a contemplated solution containing parent and desired daughter radionuclides can and usually does contain a plurality of parent radionuclides as are well-known from radioactive decay schemes, as well as one or more daughter nuclides that include the desired daughter nuclide and its daughter nuclides.

A contemplated method preferably uses a plurality of chromatographic columns for the separation. The separation medium packings of those columns have different selectivities for the parent and desired daughter radionuclides, and those selectivities are inverted from the selectivities that are usually used for similar separations as practiced in the conventional generator methodology of FIG. 2. That is, the first separation medium contacted with an aqueous solution containing the parent and desired daughter has a greater selectivity for the desired daughter than for the parent or other daughters that may be present, whereas at least one later-contacted separation medium has a greater selectivity for the parent than for the desired daughter radionuclide. It should be noted that a plurality of second separation media can be used in one separation, with those media being in separate or the same guard columns as is appropriate to the specific media employed.

Solution storage of the radioactive parent and daughters has the profound advantage of minimizing radiolytic degradation of the chromatographic separation material that is responsible for the product purity because the majority of the radiolytic damage is relegated to the solution matrix, for example, water, rather than to the separation medium.

The integrity of the separation medium is further maintained by using high chromatographic flow rates (e.g., by an automated fluid delivery system) to minimize the duration of contact between the radioactive solution and the separation medium selective for daughter radionuclides. Preserving the chemical integrity of the separation medium equates to more predictable separation performance and reduces the likelihood of parent radionuclide contamination of the daughter product. Furthermore, by targeting extraction of the desired daughter radionuclides as needed rather than by eluting a conventional generator, inorganic sorbents resistant to radiolysis are not required and a greater variety of chromatographic separation media with greater solute selectivity may be employed.

Figure 3:
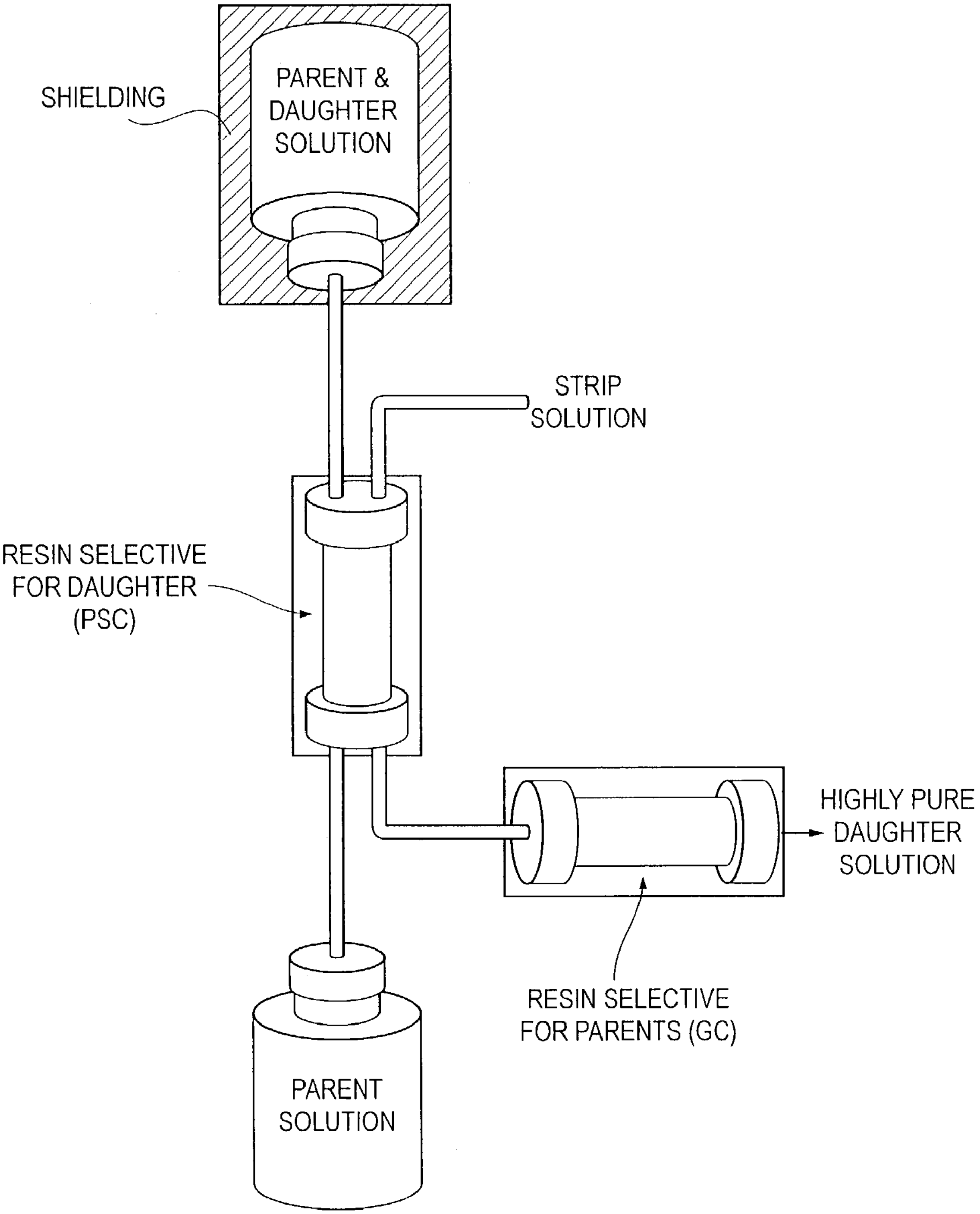
FIG. 3 is a schematic depiction of the generic logic of the multicolumn selectivity inversion generator described herein and in which PSC refers to Primary Separation Column and GC refers to Guard Column.

To further minimize the likelihood of parent radionuclide contamination, another separation medium selective for the parent(s) is introduced downstream from the desired daughter-selective separation medium. The addition of a second separation column adds another dimension of security ensuring that hazardous long-lived parent radionuclides are not administered to the patient. An example of such a tandem column arrangement is depicted in FIG. 3. Exemplary desired daughter ion/parent ion groups that can be readily separated using the subject method include $Y^{3+}/Sr^{2+}$; $TcO_4^{1-}/MoO_4^{2-}$; $PdCl_4^{2-}/Rh^{3+}$; $In^{3+}/Cd^{2+}$; $I^{1-}/Sb^{3+}$; $ReO_4^{1-}/WO_4^{2-}$; $Tl^{1+}/Pb^{2+}$; $Sc^{3+}/Tio^{2+}$ or $Ti^{4+}$; $Bi^{3+}/Ra^{2+}$, $Pb^{2+}$; $Bi^{3+}/Ac^{3+}$, $Ra^{2+}$; $At^{1-}/Bi^{3+}$; and $Ra^{2+}/Ac^{3+}$, $Th^{4+}$.

As shown at the top of FIG. 3, parent and desired daughter radionuclides are permitted to approach or reach radioactive steady state in an aqueous solution matrix that receives the brunt of the radiation dose, rather than on the separation medium that is responsible for the efficiency of the chemical separation. When needed, the solution containing the parent and desired daughter radionuclides is contacted with (loaded on) a chromatographic column containing a first separation medium that is selective for the daughter radionuclide (the primary separation column), while permitting the one or more parents and any other "daughters" such as those of the desired daughter radionuclide to elute. The desired daughter and one or more parent radionuclides have one or both of different (i) ionic charges or (ii) charge densities as they are present in that solution.

Thus, as to ionic charges, one of the parent and daughter radionuclides can be a +2 cation and the other a +3 cation, or one can be a +2 cation and the other a −1 anion, and the like, as they are present in the solution used to contact the first separation medium. Typically, the parent and desired daughter radionuclides maintain their differences in charge throughout the complete separation process, but need not. For example, where $TcO_4^{1-}$ is to be separated from $MoO_4^{2-}$ or $ReO_4^{1-}$ is to be separated from $WO_4^{2-}$, those anions maintain their charges throughout the separation. On the other hand, bismuth and actinium both typically have +3 charges, but bismuth is preferentially separated from actinium as a solution complex with chloride ions such as the $BiCl_4^{1-}$ anion whereas actinium does not form such a complex under the same conditions and remains as an $Ac^{3+}$ cation.

Although a large number of chemical separations can be conveniently described by acknowledging the differences in the net ionic charge of two or more analytes as the basis for separation, many other separations rely on more subtle differences in the coordination chemistry and/or solution speciation as a means of effecting separation. As a general approximation, the differences in coordination preferences and/or solution speciation between two ions can be conveniently attributed to the different charge densities, where electrostatic interactions predominate.

The charge density is defined as the overall charge per unit volume occupied by a given mono- or polyatomic ion. The concept of charge density is a contributing factor to Hard/Soft Acid/Base Theory. In accordance with that Theory, ions defined as "Hard" are not very polarizable and typically have large absolute values of charge density (e.g., $Li^{+}$, $Al^{3+}$, $F^{-}$, and $O^{2-}$) whereas those ions defined as "Soft" have lower charge densities and are more easily polarized (e.g., $Hg^{2+}$, $Bi^{3+}$, $I^{1-}$, $TcO_4^{1-}$, and the like).

Explanations based solely on differences in ionic charge do not adequately describe the many separations of similarly-charged analytes that are routinely segregated based on differences in the charge densities of those analytes; for example, separation of $Ce^{3+}$ from $Lu^{3+}$ or $F^{1-}$ from $I^{1-}$. For the $Ce^{3+}/Lu^{3+}$ separation, the cations are of identical charge but the well-known lanthanide contraction effects a systematic decrease in the lanthanide ionic radius and, hence the ionic volume, which results in a net increase in charge density across the lanthanide series. This net increase in charge density can effect differences in the hydration number (primary and secondary spheres), solution speciation, and coordination chemistry that, individually or collectively, can serve as the basis for a separation.

In another example, the charge density of the halide anions decreases upon travelling down the group, as the ionic radius (and volume) increases and the charge becomes more diffuse. Such differences in charge density can be exploited for separations because the electrostatic interactions governing ion-ligand and ion-solvent interactions are different, which provides a convenient chemical aspect to be exploited for a given separation.

The concept of charge density is not limited strictly to monatomic ions, and is readily extended to polyatomic species; for example, $NH_4^{1+}/N(CH_2CH_3)^{1+}$ and $TcO_4^{1-}/IO_3^{1-}$. In each example, the ions are of like charge but each occupies a different volume, thereby changing the charge density and altering the ionic interaction characteristics and solution speciation, as reflected in the parameters such as free energies of hydration, overall hydration number, complex formation constants, and the like.

The eluate from the primary separation column (desired daughter-depleted parent-daughter solution or solution having a lessened concentration of desired daughter radionuclide) that contains the parent and a lessened amount of the desired daughter radionuclide is removed (separated) from the first separation medium that is laden with the desired daughter. That solution can be discarded, but is preferably collected into a vessel and permitted to again approach radioactive steady state so that further amounts of desired daughter can be obtained. The primary separation column containing the daughter radionuclide is then typically rinsed to remove any residual impurities that might be present such as from the interstices prior to elution of the daughter (stripping).

In order to maximize the convenience and effectiveness of this multicolumn generator method, knowledge of the solution speciation of the daughter radionuclide and its radionuclidic parents are used to select both the strip solution and the material or materials of the second separation medium of the second chromatographic column (the guard column). In ideal practice, the daughter-selective primary separation medium-containing column is stripped with a solution that permits the desired daughter radionuclide to elute directly through the guard column without the need for any chemical adjustment to the solution medium, while any parent or other daughter ion interferents are retained on that second column.

Solution storage of the radioactive source material and use of a multicolumn selectivity inversion method in which the desired daughter radionuclide is first selectively extracted and then further decontaminated of residual parent ions by a second separation medium-containing guard column serve to minimize radiolytic damage to the support medium and afford reliable production of near theoretical yields of highly pure desired daughter radionuclides. In a typical application, a primary separation column exhibits a high affinity for the desired daughter and a low affinity for the parent and any other daughter radionuclides, whereas the guard column contains a second separation medium that has high affinity for the parent and a low affinity for the desired daughter radionuclide.

Such a pairing affords a combined decontamination factor (DF) of parent from desired daughter radionuclide of about $10^4$ to about $10^{10}$, or greater, under the conditions of contacting the multiple separation media. Separately, each column utilized provides a DF about $10^2$ to about $10^5$, or greater, under the conditions of contacting. The DF for a given step is multiplied with the DF for the next step or, when represented using exponents, the DF value exponents are added for each step. A DF value of about $10^{10}$ is about the largest DF that can be readily determined using typical radioanalytical laboratory apparatus.

The Decontamination factor (DF) is defined using the following equation:

$$DF = \left( \frac{\dfrac{[\text{Analyte}]_{effluent}}{[\text{Impurity}]_{effluent}}}{\dfrac{[\text{Analyte}]_{influent}}{[\text{Impurity}]_{influent}}} \right)$$

For a system at radioactive steady state (e.g., $^{224}Ra$ and it daughters including $^{212}Bi$ and its daughters), the denominator is about 1. This means a DF value can be approximated by examining the stripping peak in a chromatogram and dividing the maximum cpm/mL for the analyte (i.e., the desired $^{212}Bi$ daughter radionuclide) by the activity of the impurities (i.e., $^{224}Ra$ parents).

Alternatively, the DF can be calculated by taking the ratio of the dry weight distribution ratios ($D_w$) for an analyte and impurity. Assuming the "influent" is at radioactive steady state (making the denominator for DF unity ), the ratio of $D_w$ values for analyte/impurity are:

$$DF = \frac{\left(\dfrac{A_o - A_f}{A_f}\right)^{analyte} \Big/ \left(\dfrac{V}{m_R \cdot (\%\ \text{solids}/100)}\right)}{\left(\dfrac{A_o - A_f}{A_f}\right)^{impurity} \Big/ \left(\dfrac{V}{m_R \cdot (\%\ \text{solids}/100)}\right)}$$

which simplifies after cancellation to:

$$DF = \frac{\left(\dfrac{A_o - A_f}{A_f}\right)^{analyte}}{\left(\dfrac{A_o - A_f}{A_f}\right)^{impurity}}$$

where $A_o$, $A_f$, V, $m_R$ and % solids are as defined elsewhere. These ratios of activities are proportional to the molar concentrations cited elsewhere in the definition of DF.

Figure 1:
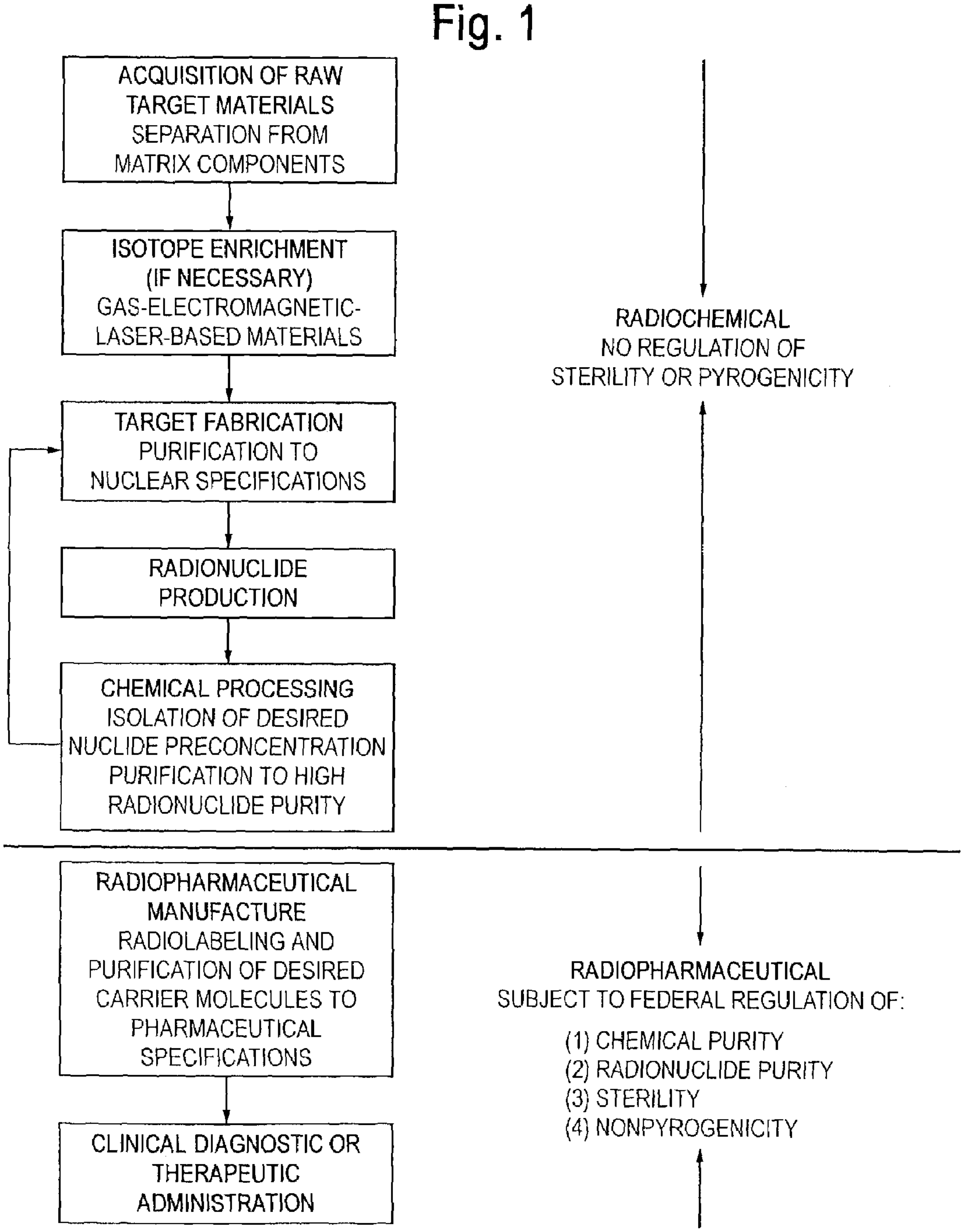
FIG. 1 is a schematic drawing modified from Bond et al., *Ind. Eng. Chem. Res.* (2000) 39:3130–3134 that shows the seven primary steps in the production of medically useful radionuclides and their respective purity and regulatory requirements.
Figure 2:
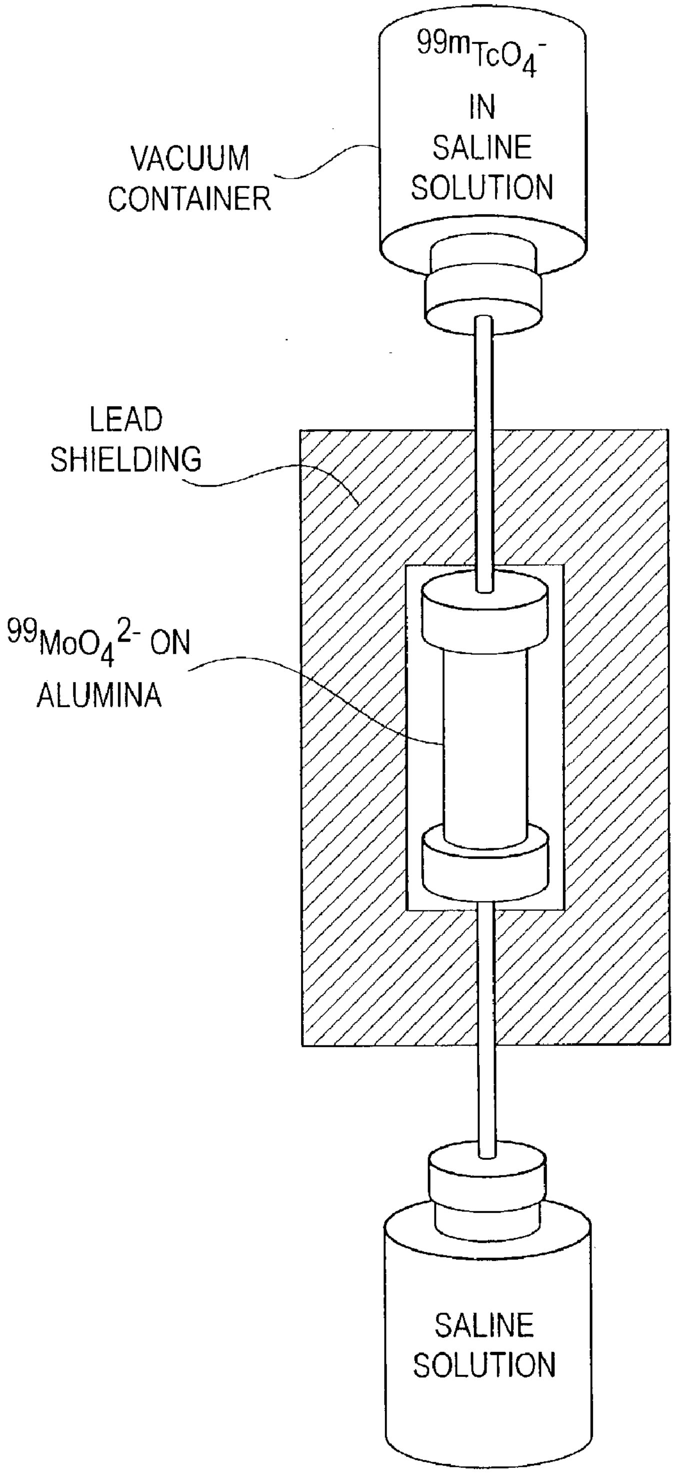
Fig. 2 PRIOR ART
FIG. 2 is a schematic drawing that shows the conventional generator methodology using an ascending flow elution as deployed for $^{99m}$Tc.

The fundamental differences between a contemplated multicolumn selectivity inversion generator technology and the conventional methodology presented in FIG. 2 are thus at least three-fold: (1) the storage medium for the parent radionuclides is a solution rather than a solid support, (2) the desired daughter radionuclide is selectively extracted from the parent radionuclide-containing solution when needed, and (3) a second separation medium prevents the exit of parent radionuclides from the generator system.

In addition to minimizing radiolytic damage to the chromatographic support, extraction of the minute masses of daughter (i.e., the minor constituent) by use of the multicolumn selectivity inversion generator shown in FIG. 3 permits the use of small chromatographic columns. Thus, the desired daughter radionuclide can be recovered in a small volume of solution that is conveniently diluted to the appropriate dose for clinical use. Typically, 90 percent of the daughter radionuclide can be delivered in less than about five bed volumes of the first separation medium of the first column.

A contemplated separation method is typically carried out at ambient room temperature. Gravity flow through the columns can be used, but it is preferred that the separation be carried out at more than one atmosphere of pressure as can be provided by a hand-operated syringe or electric pump. The use of less than one atmosphere of pressure (e.g., vacuum assisted flow) as can be achieved by use of a syringe is also preferred.

The time of contact between a solution and a separation medium is typically the residence time of passage of the solution through a column under whatever pressure head is utilized. Thus, although one can admix a given solution and separation medium and maintain the contact achieved there between a period of hours or days, sorption by the separation medium is usually rapid enough; that is, the binding and phase transfer reactions are sufficiently rapid, that contact provided by flow over and through the separation medium particles provides sufficient contact time to effect a desired separation.

The general concept of a selectivity inversion between the extraction of the desired daughter radionuclide by the primary separation column and the retention of parents and other interferents by the guard column represents an important aspect of this invention. A seemingly similar concept is briefly proposed for use with the diagnostic $^{64}Cu$ radionuclide [see, Zinn, U.S. Pat. No. 5,409,677 (1995)], however, the application of the multicolumn selectivity inversion generator to radiotherapeutic nuclides or to high specific activity diagnostic radionuclides has not before been examined or appreciated, and the ionic charges of both the parent and daughter radionuclides in that disclosure are the same, +2 for copper and zinc ions. The charge densities of the $Cu^{2+}$ and $Zn^{2+}$ ions are also substantially the same.

Thus, the example cited for $^{64}Cu$ relies exclusively on the use of an immobilized ligand to complex $^{64}Cu$ and removes it from macroquantities of zinc isotopes. One reference is made to secondary removal of zinc from the $^{64}Cu$ product by an unidentified anion-exchange resin, which is made necessary by the poor selectivity exhibited by the complexing ligand in the initial separation. Furthermore, large bed volumes are required and the $^{64}Cu$ product is delivered in >20 mL of strongly acidic solution, which requires secondary concentration and neutralization before the $^{64}Cu$ can be conjugated to a biolocalization agent for use in a medical procedure. The proposed $^{64}Cu$ separation system does not discuss the identity of ionic charges of the ions to be separated, nor any application for use with high specific activity radionuclide generators or high LET radiation, both of which present unique challenges to the design of radionuclide generators.

When radiolytic degradation of the support material is less of a concern (e.g., for diagnostic radionuclides), the multicolumn selectivity inversion generator shown in FIG. 3 continues to offer many advantages. By example, target irradiation in an accelerator or reactor frequently requires the use of isotopically enriched target materials to maximize the production of the desired parent radionuclides. Such nucleosynthesis reactions can be inefficient, producing only low specific activity parents. By using the multicolumn selectivity inversion generator and extracting only the small mass of the daughter constituent, the macroquantities of the isotopically enriched target ions are kept in solution and can be more easily recovered for future irradiation. Equally important is the small volume of solution in which the daughter radionuclide is recovered; made possible by the use of small columns and the logic of the multicolumn selectivity inversion generator.

The present method is typically configured to operate substantially free from air or gas, thereby permitting better chromatographic performance. The presence of interstitial gas pockets can result in the solution passing through the channel without flowing over, through or around the beads; rather, the solution passes through the channel without contacting the separation medium. Specifically, air or gas travelling through a separation medium can cause channeling in which less than the desired intimate contact between the solution and the separation medium can occur. As such, the columns used in a contemplated method are configured as a system for transporting and processing liquids.

Another advantage to such an air- or gas-less system is that there is no air or gas that must be sterilized by filtration through sterile air filters. As such, the components used in a contemplated method can be of a less complicated design than those that use combinations of air and liquid.

The benefits of this generator technology are profound and the versatility of the fundamental logic presented in FIG. 3 means that a wide variety of radionuclides can be purified using the multicolumn selectivity inversion generator concept. Table 1, below, provides a list of radionuclides of interest to nuclear medicine for imaging or therapy, along with exemplary solution conditions and chromatographic materials for their purification using a multicolumn selectivity inversion generator. The list of radionuclides and separation conditions reported in Table 1 are not to be construed as limiting, rather as examples showing how a variety of parent/daughter pairs having quite different solution chemistries, ionic charges, and charge densities can be separated and purified for use in nuclear medical applications. As new separation media become available and interest increases in other radionuclides, the multicolumn selectivity inversion generator can be readily adapted to provide a convenient route to the reliable production of radionuclides of high chemical and radionuclidic purity for use in diagnostic or therapeutic nuclear medicine.

TABLE 1

| Nuclide[a] | Primary method(s) of generation[b] / Key separation (solute/interferent) | Load solution / Primary separation column[c] | Strip solution / Guard column |
|---|---|---|---|
| $^{90}Y$ | $^{90}Sr(\beta^-) \rightarrow ^{90}Y$ / $Y^{3+}/Sr^{2+}$ | 0.5 M $HNO_3$ / AOPE-EXC | 3 M $HNO_3$ / Sr Resin-EXC |
| $^{99m}Tc$ | $^{90}Mo(\beta^-) \rightarrow ^{99m}Tc$ / $TcO_4^{1-}/MoO_4^{2-}$ | 5 M NaOH / ABEC® | Phys. Saline Solution[e] / $Al_2O_3$ |
| $^{103}Pd$ | $^{103}Rh(p, n)$ $^{103}Pd$ / $PdCl_4^{2-}/Rh^{3+}$ in $SO_4^{2-}/Cl^-$ | 0.5 M HCl / NE-EXC | pH = 4-6 / CIX |
| $^{111}In$ | $^{112}Cd(p, 2n)$ $^{111}In$ / $In^{3+}/Cd^{2+}$ | 0.1 M HCl / AOPE-EXC | 1 M HCl / AIX |

TABLE 1-continued

| Nuclide[a] | Primary method(s) of generation[b]<br>Key separation (solute/interferent) | Load solution<br>Primary separation column[c] | Strip solution<br>Guard column |
|---|---|---|---|
| $^{125}I$ | $^{112}Sb(\alpha, 2n)\ ^{125}I$<br>$I^{1-}/Sb^{3+}$ | Dil. HCl<br>NE-EXC | pH = 4-6<br>CIX |
| $^{188}Re$ | $^{186}W(2n, \gamma)\ ^{188}W(\beta^-) \rightarrow ^{188}Re$<br>$ReO_4^{1-}/WO_4^{2-}$ | 5 M NaOH<br>ABEC | Phys. Saline Solution<br>$Al_2O_3$ |
| $^{201}Tl$ | $^{203}Tl(p, 3n)\ ^{201}Pb(EC) \rightarrow ^{201}Tl$<br>$Tl^{1+}/Pb^{2+}$ | Holdback reagent[d]<br>CIX | 2 M $HNO_3$<br>Sr Resin-EXC |
| $^{47}Sc$ | $^{47}Ti(n, p)\ ^{47}Sc$<br>$Sc^{3+}/TiO^{2+}$ or $Ti^{4+}$ in $SO_4^{2-}$ | $HNO_3/HF$<br>MF-NE-EXC | 2 M HCl<br>AOPE-EXC |
| $^{212}Bi$ | $^{224}Ra \rightarrow \rightarrow ^{212}Pb(\beta^-) \rightarrow ^{212}Bi$<br>$Bi^{3+}/Ra^{2+}, Pb^{2+}$ | 0.2 M HCl<br>NE-EXC | 1 M NaOAc<br>0.2 M NaCl<br>CIX |
| $^{213}Bi$ | $^{225}Ac(\alpha) \rightarrow \rightarrow ^{213}Bi$<br>$Bi^{3+}/Ac^{3+}, Ra^{2+}$ | 0.2 M HCl<br>NE-EXC | 1 M NaOAc<br>0.2 M NaCl<br>CIX |
| $^{211}At$ | $^{209}Bi(\alpha, 2n)^{211}At$<br>$At^{1-}/Bi^{3+}$ | Dil. HCl<br>NE-EXC | ph = 4-6<br>CIX |
| $^{223}Ra$ | $^{227}Ac(\beta^-) \rightarrow ^{227}Th(\alpha) \rightarrow ^{223}Ra$<br>$Ra^{2+}/Ac^{3+}, Th^{4+}$ | Holdback reagent<br>Weak acid CIX | $HNO_3$<br>Dipex-EXC |

[a]Medically useful radionuclides as defined by the nuclear medicine community. [Bond et al., Ind. Eng. Chem. Res. (2000) 39:3130–3134].
[b]Several production routes often exist and those cited are the generally accepted routes for nuclear medicine.
[c]Widely used separation methods include: AIX = anion-exchange chromatography; CIX = cation-exchange chromatography; EXC = extraction chromatography; AOPE-EXC = acidic organophosphorus extractant-EXC; NE-EXC = neutral organic extractant-EXC, MF-NE-EXC = multifunctional neutral organic extractant-EXC, ABEC = Aqueous Biphasic Extraction Chromatography.
[d]Holdback reagents include carboxylates, polyaminocarboxylates, certain inorganic anions, chelating agents, etc.
[e]Phys. Saline Solution = Physiological Saline Solution.

[a]Medically useful radionuclides as defined by the nuclear medicine community. [Bond et al., *Ind. Eng. Chem. Res.* (2000) 39:3130–3134].

[b]Several production routes often exit and those cited are the generally accepted routes for nuclear medicine.

[c]Widely used separation methods include: AIX=anion-exchange chromatography; CIX=cation-exchange chromatography; EXC=extraction chromatography; AOPE-EXC=acidic organophosphorus extractant-EXC; NE-EXC=neutral organic extractant-EXC, MF-NE-EXC=multifunctional neutral organic extractant-EXC, ABEC=Aqueous Biphasic Extraction Chromatography.

[d]Holdback reagents include carboxylates, polyaminocarboxylates, certain inorganic anions, chelating agents, etc.

[e]Phys. Saline Solution=Physiological Saline Solution.

A contemplated method and system can utilize one or more separation media. The separation medium or media utilized for a given separation is governed by the radionuclides to be separated, as is well-known. Preferred separation media are typically bead-shaped or of consistent size and morphology solid phase resins, although sheets, webs, or fibers of separation medium can be used.

One preferred solid phase separation medium is the Bio-Rad® 50W-X8 cation exchange resin in the $H^+$ form, which is commercially available from Bio-Rad Laboratories, Inc., of Hercules, Calif. Other useful strong acid cation-exchange media include the Bio-Rad® AGMP-50 and Dowex® 50W series of ion-exchange resins and the Amberlite® IR series of ion-exchange resins that are available from Sigma Chemical Co., St. Louis, Mo. Anion-exchange resins such as the Bio-Rad® AGMP-1 and Dowex® 1 series of anion-exchange resins can also serve as separation media.

Another resin that can be used in the present process is a styrene-divinyl benzene polymer matrix that includes sulfonic, phosphonic, and/or gem-diphosphonic acid functional groups chemically bonded thereto. Such a gem-diphosphonic acid resin is commercially available from Eichrom Technologies, Inc., located at 8205 S. Cass Avenue, Darien, Ill., under the name Diphonix® resin. In the present process, the Diphonix® resin is used in the $H^+$ form. The characteristics and properties of Diphonix® resin are more fully described in U.S. Pat. No. 5,539,003, U.S. Pat. No. 5,449,462 and U.S. Pat. No. 5,281,631.

The TEVA™ resin, having a quaternary ammonium salt, specifically, a mixture of trioctyl and tridecyl methyl ammonium chlorides, sorbed on a water-insoluble support that is inert to the components of the exchange composition, is highly selective for ions having the tetravalent oxidation state. For example, the +4 valent thorium ions are bound to the TEVA™ resin in nitric acid solution, whereas the actinium (Ac) and radium (Ra) ions (whose valencies are +3 and +2, respectively) are not substantially extracted by contact with this resin under the same conditions. The TEVA™ resin is commercially available from Eichrom Technologies, Inc.

In a contemplated method, the second separation medium (ion-exchange medium) contains diphosphonic acid (DPA) ligands or groups. Several types of DPA-containing substituted diphosphonic acids are known in the art and can be used herein. An exemplary diphosphonic acid ligand has the formula $$CR^1R^2(PO_3R_2)_2,$$

wherein R is selected from the group consisting of hydrogen (hydrido), a $C_1$–$C_8$ alkyl group, a cation, and mixtures thereof;

$R^1$ is hydrogen or a $C_1$–$C_2$ alkyl group; and $R^2$ is hydrogen or a bond to a polymeric resin.

When $R^2$ is a bond to a polymeric resin, the phosphorus-containing groups are present at 1.0 to about 10 mmol/g dry weight of the copolymer and the mmol/g values are based on the polymer where $R^1$ is hydrogen. Exemplary exchange media containing diphosphonic acid ligands are discussed hereinbelow.

One such exchange medium is referred to as Dipex® resin, which is an extraction chromatographic material containing a liquid diphosphonic acid extractant belonging to a class of diesterified methanediphosphonic acids, such as di-2-ethylhexyl methanediphosphonic acid. The extractant is sorbed on a substrate that is inert to the mobile phase such as Amberchrom®-CG71 (available from TosoHaas, Montgomeryville, Pa.) or hydrophobic silica. In this extractant, $R^1$ and $R^2$ are H and one R is 2-(ethyl)-hexyl and the other is H.

Dipex® resin has been shown to have a high affinity for trivalent lanthanides, various tri-, tetra-, and hexavalent actinides, and the trivalent cations of the preactinide $^{225}Ac$, and to have a lower affinity for cations of radium and certain decay products of $^{225}Ac$. These affinities have been shown even in the presence of complexing anions such as fluoride, oxalate, and phosphate.

The active component of a preferred Dipex® resin is a liquid diphosphonic acid of the general formula,

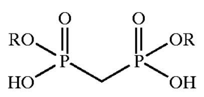

where R is $C_6$–$C_{18}$ alkyl or aryl, and preferably an ester derived from 2-ethyl-1-hexanol. A preferred compound is P,P'-bis-2-(ethyl)hexyl methanediphosphonic acid.

The active component diphosphonic acid ester can be mixed with a lower boiling organic solvent such as methanol, ethanol, acetone, diethyl ether, methyl ethyl ketone, hexanes, or toluene and coated onto an inert support, such as glass beads, polypropylene beads, polyester beads, or silica gel as known in the art for use in a chromatographic column. Acrylic and polyaromatic resins such as AMBERLITE®, commercially available from Rohm and Haas Company of Philadelphia, Pa., can also be used.

The properties and characteristics of Dipex® resin are more fully described in Horwitz et al. U.S. Pat. No. 5,651,883 and Horwitz et al. U.S. Pat. No. 5,851,401. Dipex® resin is available from Eichrom Technologies, Inc.

Another useful ion-exchange resin is Diphosil™ resin. Similar to the other DPA resins, Diphosil™ resin contains a plurality of geminally substituted diphosphonic acid ligands such as those provided by vinylidene diphosphonic acid. The ligands are chemically bonded to an organic matrix that is grafted to silica particles. Diphosil™ resin is available from Eichrom Technologies, Inc.

Yet another useful resin has pendent —$CR^1(PO_3R_2)_2$ groups added to a preformed water-insoluble copolymer by grafting; that is, the pendent phosphonate groups are added after copolymer particle formation. For these polymers, R is hydrogen (hydrido), a $C_1$–$C_8$ alkyl group, a cation or mixtures thereof, and $R^1$ is hydrogen or a $C_1$–$C_8$ alkyl group. A contemplated pendent —$CR^1(PO_3R_2)_2$ group for this group of resins has the formula shown below. The particles also contain zero to about 5 mmol/g dry weight of pendent aromatic sulfonate groups.

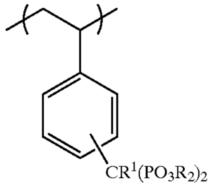

A contemplated pendent methylene diphosphonate as first formed typically contains two $C_1$–$C_8$ dialkyl phosphonate ester groups. Exemplary $C_1$–$C_8$ alkyl groups of those esters and other $C_1$–$C_8$ alkyl groups noted herein include methyl, ethyl, propyl, isopropyl, butyl, t-butyl, pentyl, cyclopentyl, hexyl, cyclohexyl, 4-methylcyclopentyl, heptyl, octyl, cyclooctyl, 3-ethylcyclohexyl and the like, as are well-known. An isopropyl group is a preferred R group. An $R^1$ $C_1$–$C_2$ alkyl group is a methyl or ethyl group, and $R^1$ is most preferably hydrogen.

After formation, the alkyl ester groups are hydrolyzed so that for use, R in the above formula is hydrogen (a proton), $Ca^{2+}$ ion or an alkali metal ion such as lithium, sodium, or potassium ions.

Preferably, the insoluble copolymer contains at least 2 mole percent reacted vinylbenzyl halide with that percentage more preferably being about 10 to about 95 mole percent. One or more reacted monoethylenically unsaturated monomers as discussed before are present at about 2 to about 85 mole percent, with this monomer preferably including at least 5 mole percent of an above monoethylenically unsaturated aromatic monomer such as styrene, ethyl styrene, vinyl toluene (methyl styrene) and vinyl xylene.

A useful insoluble copolymer also includes a reacted cross-linking agent (cross-linker). Reacted cross-linking agents useful herein are also quite varied. Exemplary useful cross-linking agents are selected from the group consisting of divinylbenzene, trimethylolpropane triacrylate or trimethacrylate, erythritol tetraacrylate or tetramethacrylate, 3,4-dihydroxy-1,5-hexadiene and 2,4-dimethyl-1,5-hexadiene. Divinylbenzene is particularly preferred here.

The amount of reacted cross-linker is that amount sufficient to achieve the desired insolubility. Typically, at least 0.3 mole percent reacted cross-linker is present. The reacted cross-linking agent is preferably present at about 2 to about 20 mole percent.

These contemplated particles are the multi-step reaction product of a nucleophilic agent such as $CR^1(PO_3R_2)_2^-$, which can be obtained by known methods, with a substrate. Thus, $CHR^1(PO_3R_2)_2$, where R is preferably an alkyl group, is first reacted with sodium or potassium metal, sodium hydride or organolithium compounds, for example, butyllithium, or any agent capable of generating a diphosphonate carbanion. The resulting carbanion is then reacted with a substrate that is a before-discussed insoluble cross-linked copolymer of one or more of vinyl aliphatic, acrylic, or aromatic compounds and a polyvinyl aliphatic, acrylic, or aromatic compound, for example, divinylbenzene. That copolymer contains at least 2 mole percent of a reacted halogenated derivative of vinyl aromatic hydrocarbon such as vinylbenzyl chloride group, preferably from 10 to 95 mole percent, about 2 to about 85 mole percent of monovinyl aromatic hydrocarbon such as styrene and at least 0.3 mole percent of polyvinyl aliphatic and/or aromatic cross-linker such as divinylbenzene, preferably 2–20 mole percent.

The copolymer containing grafted methylene diphosphonate tetraalkyl ester groups in an amount corresponding to about 1.0 mmol/g of dry weight, preferably from 2 to 7 mmol/g of dry weight, is preferably reacted with a sulfonating agent such as chlorosulfonic acid, concentrated sulfuric acid, or sulfur trioxide in order to introduce strongly acidic pendent aromatic sulfonic groups into their structure. The presence of the sulfonate pendent groups confers the additional advantage of hydrophilicity to the particles and leads to a surprising enhancement in the rate of cation complexation without adversely affecting the observed selectivity.

The reaction of the sulfonating agent with a grafted copolymer containing methylene diphosphonate groups is usually carried out when the recovered resin product in ester form is swollen by a halohydrocarbon such as dichloromethane, ethylene dichloride, chloroform, or 1,1,1-trichloroethane. The sulfonation reaction can be performed using 0.5 to 20.0 weight percent of chlorosulfonic acid in one of the mentioned halohydrocarbon solvents at temperatures ranging from about −25° to about 50° C., preferably at about 10° to about 30° C. The reaction is carried out by contacting resin preswollen for zero (unswollen) to about two hours with the above sulfonation solution for 0.25 to 20 hours, preferably 0.5 to two hours.

After completion of the sulfonation reaction, the particles are separated from the liquid reaction medium by filtration, centrifugation, decantation, or the like. This final, second resin product is carefully washed with dioxane, water, 1 M NaOH, water, 1 M HCl and water, and then air dried.

The sulfonation reaction and work-up in water also hydrolyzes the phosphonate $C_1$–$C_8$ alkyl ester groups. Where sulfonation is not carried out, hydrolysis of the phosphonate esters can be carried out by reaction with an acid such as concentrated hydrochloric acid at reflux.

These contemplated particles contain as pendent functional groups both methylene diphosphonate and sulfonate groups, directly attached to carbon atoms of aromatic units or acrylate or methacrylate units in the polymer matrix. A contemplated resin displays high affinity towards a wide range of divalent, trivalent, and polyvalent cations over a wide range of pH values. At a pH value below one, the resins are able to switch from an ion-exchange mechanism of cation removal to a bifunctional ion-exchange/coordination mechanism due to the coordination ability of the phosphoryl oxygen atoms. The sulfonic acid groups then act to make the matrix more hydrophilic for rapid metal ion access; the methylene diphosphonate groups are thus responsible for the high selectivity. Further details for the preparation of this resin can be found in Trochimczuk et al. U.S. Pat. No. 5,618,851.

Another particularly useful separation medium that is described in U.S. Pat. No. 5,110,474 is referred to as Sr Resin and is available from Eichrom Technologies, Inc. Briefly, the Sr Resin comprises an inert resin substrate upon which is dispersed a solution a crown ether extractant dissolved in a liquid diluent.

The diluent is an organic compound that has: (i) a high boiling point; that is, about 170° to 200° C., (ii) limited or no solubility in water, (iii) is capable of dissolving from about 0.5 to 6.0 M water, and (iv) is a material in which the crown ether is soluble. These diluents include alcohols, ketones, carboxylic acids, and esters. Suitable alcohols include 1-octanol, which is most preferred, although 1-heptanol and 1-decanol are also satisfactory. The carboxylic acids include octanoic acid, which is preferred, in addition to heptanoic and hexanoic acids. Exemplary ketones include 2-hexanone and 4-methyl-2-pentanone, whereas esters include butyl acetate and pentyl acetate.

The macrocyclic polyether can be any of the dicyclohexano crown ethers such as dicyclohexano-18-Crown-6, dicyclohexano 21-Crown-7, or dicyclohexano-24-Crown-8. The preferred crown ethers have the formula: 4,4'(5')[(R,R') dicyclohexano]-18-Crown-6, where R and R' are one or more members selected from the group consisting of H and straight chain or branched alkyls containing 1 to 12 carbons. Examples include, methyl, propyl, isobutyl, t-butyl, hexyl, and heptyl. The preferred ethers include dicyclohexano-18-crown-6 (DCH18C6) and bis-methylcyclohexano-18-Crown-6 (DMeCH18C6). The most preferred ether is bis-4,4'(5')-[(t-butyl)cyclohexano]-18-Crown-6 (Dt-BuCH18C6).

The amount of crown ether in the diluent can vary depending upon the particular form of the crown ether. For example, a concentration of about 0.1 to about 0.5 M of the most preferred t-butyl form (Dt-BuCH18C6) in the diluent is satisfactory, with about 0.2 M being the most preferred. When the hydrogen form is used, the concentration can vary from about 0.25 to about 0.5 M.

The preferred Sr Resin utilizes an inert resin substrate that is a nonionic acrylic ester polymer bead resin such as Amberlite® XAD-7 (60 percent to 70 percent by weight) having a coating layer thereon of a crown ether such as Dt-BuCH18C6 (20 percent to 25 weight percent) dissolved in n-octanol (5 percent to 20 weight percent), having an extractant loading of 40 weight percent. [See, Horwitz et al., *Solvent Extr. Ion Exch.*, 10(2):313–16 (1992).]

It has also been observed that Pb Resin, a related resin, also available from Eichrom Technologies, Inc. is also useful for purifying and accumulating $^{212}$Pb for the production of $^{212}$Bi. Pb Resin has similar properties to Sr Resin except that a higher molecular weight alcohol; that is, isodecyl alcohol, is used in the manufacture of Pb Resin. [See, Horwitz et al., *Anal. Chim. Acta*, 292:263–73 (1994).] It has been observed that Pb Resin permits subsequent stripping of the $^{212}$Bi from the resin, whereas it has been observed that $^{212}$Pb is strongly retained by the Sr Resin.

An improved Sr Resin also available from Eichrom Technologies, Inc. is even more selective. This separation medium is referred to as Super Pb(Sr)™ selective resin and comprises free-flowing particles having about 5 to about 50 weight percent of a bis-4,4'(5') [$C_3$–$C_8$-alkylcyclohexano] 18-Crown-6, such as Dt-BuCH18C6, that exhibits a partition ratio between n-octanol and 1 M nitric acid ($D_{Crown}$=[$Crown_{org}$]/[$Crown]_{Aq}$) of greater than about $10^3$, and usually of about $10^3$ to about $10^6$, dispersed onto an inert, porous support such as polymeric resin (e.g., Amberchrom®-CG71) or silica particles. The separation medium is free of a diluent, and particularly free of a diluent that is: (i) insoluble or has limited (sparing) solubility in water and (ii) capable of dissolving a substantial quantity of water that is present in the Sr Resin. See, U.S. Pat. No. 6,511,603 B1.

Preferred wash and strip solutions that are used are also selected based upon the parent and daughter radionuclides and the desired use of the product. The reader is directed to Horwitz et al. U.S. Pat. No. 5,854,968 and Dietz et al. U.S. Pat. No. 5,863,439 for an illustrative discussion of this separation medium.

Yet another separation medium is particularly useful for separating chaotropic anions in aqueous solution. This separation medium is available from Eichrom Technologies, Inc. under the designation ABEC®, and comprises particles having a plurality of covalently bonded —X—$(CH_2CH_2O)_n$—$CH_2CH_2R$ groups wherein X is O, S, NH or N—$(CH^2CH_2O)_m$—$R^3$ where m is a number having an average value of zero to about 225, n is a number having an average value of about 15 to about 225, $R^3$ is hydrogen, $C_1$–$C_2$ alkyl, 2-hydroxyethyl or $CH_2CH_2R$, and R is selected from the group consisting of —OH, $C_1$–$C_{10}$ hydrocarbyl ether having a molecular weight up to about one-tenth that of the —$(CH_2CH_2O)_n$— portion, carboxylate, sulfonate, phosphonate and —$NR^1R^2$ groups where each of $R^1$ and $R^2$ is independently hydrogen, $C_2$–$C_3$ hydroxyalkyl or $C_1$–$C_6$ alkyl, or —$NR^1R^2$ together form a 5- or 6-membered cyclic amine having zero or one oxygen atom or zero or one additional nitrogen atom in the ring. The separation particles have a percent $CH_2O/mm^2$ of particle surface area of greater than about 8000 and less than about 1,000,000.

Exemplary chaotropic anions include simple anions such as $Br^{1-}$ and $I^{1-}$ and anion radicals such as $TcO_4^{1-}$, $ReO_4^{1-}$ or $IO_3^{1-}$. The chaotropic anion can also be a complex of a metal cation and halide or pseudohalide anions. A particularly useful separation that can be effected using this separation medium is that of $^{99m}TcO_4^{1-}$ from an aqueous solution that also contains the parent radionuclide $^{99}MoO_4^{2-}$ ions. Further details concerning the ABEC® separation medium and its uses can be found in U.S. Pat. Nos. 5,603,834, 5,707,525 and 5,888,397.

Exemplary chelating resins include that material known as Chelex™ resin that is available from Bio-Rad Laboratories that includes a plurality of iminodiacetate ligands and similar ligands can be reacted with 4 percent beaded agarose that is available from Sigma Chemical. Co., St. Louis, Mo.

In a preferred method that utilizes separation medium beads, the support beads that comprise the separation medium are packed into a column. When a solution is passed through the beads, the solution can flow over, through and around the beads, coming into intimate contact with the separation medium.

EXAMPLES

All acids were of trace metal grade, and all other chemicals were of ACS reagent grade and used as received. The $^{207}Bi$ and $^{133}Ba$ radioactive tracers were each evaporated to dryness twice in concentrated $HNO_3$ and dissolved in 0.50 M $HNO_3$ prior to use. Standard radiometric assay procedures were employed throughout, and all count rates were corrected for background.

The extraction chromatographic materials were prepared using a general procedure described previously. [See, Horwitz et al., *Anal. Chem.*, 63:522–525 (1991).] Briefly, a solution of 0.25 M tri-n-octylphosphine oxide (TOPO) in n-dodecane (0.78 g) was dissolved in about 25 mL of ethanol and combined with 50–100 $\mu$m Amberchrom®-CG71 resin (3.03 g) in about 25 mL of ethanol. The mixture was rotated at room temperature on a rotary evaporator for about 30 minutes after which the ethanol was vacuum distilled. The resulting solid is referred to as TOPO Resin and corresponds to 20 percent (w/w) loading of 0.25 M TOPO in n-dodecane on Amberchrom®-CG71. The modified TRPO Resin was prepared in a similar manner, except that this material contains no n-dodecane diluent and the dispersing solvent was methanol rather than ethanol. The TRPO Resin contains an equimolar mixture of Cyanex®-923 (a mixture of n-alkyl phosphine oxides) and dipentyl(pentyl)-phosphonate loaded to 40 percent on 50–100 $\mu$m Amberchrom®-CG71.

The percent solids for the Bio-Rad® AGMP-50 cation-exchange resin were determined by transferring a portion of the wet resin to a tared vial and drying in an oven at 110° C. until a constant mass was achieved. Each gravimetric analysis was performed in triplicate to provide a percent solids of 48.6(±0.3) percent. All resins were stored in tightly capped containers and were not exposed to air for any lengthy period of time to avoid a change in percent solids.

All dry weight distribution ratios were determined radiometrically by batch contacts of the resins with the desired solutions at 25(±2)° C. The dry weight distribution ratio ($D_w$) is defined as:

$$D_w = \left(\frac{A_o - A_f}{A_f}\right)\left(\frac{V}{m_R \cdot (\%\ \text{solids}/100)}\right)$$

where $A_o$=the count rate in solution prior to contact with the resin, $A_f$=the count rate in solution after contact with resin, V=volume (mL) of solution in contact with resin, $m_R$=mass (g) of wet resin, and the percent solids permits conversion to the dry mass of resin.

The batch uptake experiments were performed by adding $\mu$L quantities of $^{133}Ba$ or $^{207}Bi$ in 0.50 M $HNO_3$ to 1.2 mL of the solution of interest, gently mixing, and removing a 100 $\mu$L aliquot for γ-counting ($A_o$). One mL of the remaining solution (V) was added to a known mass of wet resin ($m_R$) and centrifuged for 1 minute. The mixture was then stirred gently (so that the resin was just suspended in the solution) for 30 minutes, followed by 1 minute of centrifugation, and another 30 minute of stirring. After 1 minute of centrifugation to settle the resin, the solution was pipeted away and filtered through a 0.45 $\mu$m PTFE filter to remove any suspended resin particles. A 100 $\mu$L aliquot was then taken for γ-counting ($A_f$). All dry weight distribution ratios are accurate to two significant digits.

A quantity of TRPO Resin in 0.20 M HCl was slurry packed into a 1.2 mL capacity Bio-Spin disposable plastic chromatography column (Bio-Rad Laboratories, Inc.) to afford a bed volume (BV) of 0.5 mL. A porous plastic frit was placed on top of the bed to prevent its disruption during the addition of eluent. The column was conditioned by eluting 3.0 mL (6 BV) of 0.20 M HCl and followed by gravity elution of 2.0 mL (4 BV) of 0.20 M HCl spiked with $^{133}Ba$ and $^{207}Bi$. The column was subsequently rinsed with 2.0 mL (4 BV) of 0.20 M HCl and the $^{207}Bi$ was stripped using 2.0 mL (4 BV) of 1.0 M sodium acetate (NaOAc) in 0.20 M NaCl. Column eluates were collected into tared γ-counting vials, and all volumes were calculated gravimetrically using the respective solution densities.

A portion of 20–50 μm Dipex® Resin {40 percent P,P'-bis(2-ethylhexyl)methanediphosphonic acid on Amberchrom-CG71, Eichrom Technologies, Inc. [see, Horwitz et al., *React. Funct. Polymers*, 33:25–36 (1997)]} in 1.0 M $HNO_3$ was slurry packed into a custom plastic chromatography column to afford a BV of 0.16 mL. Porous plastic frits were used to keep the resin in place during chromatographic operations, which were carried out using a custom automated low pressure chromatography system. The column was conditioned by eluting 4.0 mL (25 BV) of 1.0 M $HNO_3$ and followed by elution of 2.0 mL (12.5 BV) of 1.0 M $HNO_3$ spiked with $^{133}Ba$ and $^{207}Bi$ at a flow rate of about 0.25 mL/min. The column was subsequently rinsed with 2.0 mL (12.5 BV) of 1.0 M $HNO_3$ and the $^{207}Bi$ was stripped using 2.0 mL (12.5 BV) of 2.0 M HCl. Column eluates were collected into tared γ-counting vials, and all volumes were calculated gravimetrically using the respective solution densities.

As discussed above, the use of high LET α- and $\beta^{1-}$-emitting radiation holds great promise for the therapy of micrometastatic carcinoma and solid tumor masses. [See, Whitlock et al., *Ind. Eng. Chem. Res.* 39:3135–3139 (2000); Hassfjell et al., *Chem. Rev.* 101:2019–2036 (2001); Imam, *Int. J. Radiation Oncology Biol. Phys.* 51:271–278 (2001); and McDevitt et al., *Science* 294:1537–1540 (2001).] One candidate α-emitter proposed for use in cancer therapy is $^{212}Bi$ [see, Whitlock et al., *Ind. Eng. Chem. Res.* (2000) 39:3135–3139 (2000); Hassfjell et al., *Chem. Rev.* 101: 2019–2036 (2001); and Imam, *Int. J. Radiation Oncology Biol. Phys.* 51:271–278 (2001)] which forms as part of the uranium-232 ($^{232}U$) decay chain shown in FIG. 4.

Bismuth-212 is presently obtained for use by elution from a conventional generator in which the relatively long-lived (i.e., 3.66 d) $^{224}Ra$ parent is retained on a cation-exchange resin and the $^{212}Bi$ is eluted with about 1–3 M HCl or mixtures of HCl and HI. [See, Mirzadeh et al., *J. Radioanal. Nucl. Chem.* 203:471–488 (1996) and Mirzadeh, *Appl. Radiat. Isot.* 49:345–349 (1998).] Radiolytic degradation of the cation-exchange resin limits the useful deployment lifetime of the $^{212}Bi$ generator to approximately two weeks, [see, Mirzadeh et al., *J. Radioanal. Nucl. Chem.* 203: 471–488 (1998)] and a multicolumn selectivity inversion generator can provide advantages for the purification of $^{212}Bi$. The decay chain leading to $^{212}Bi$ also presents a challenging testing ground for the multicolumn selectivity inversion generator concept, and the following detailed examples target the development of a new $^{212}Bi$ generator.

Figure 4:
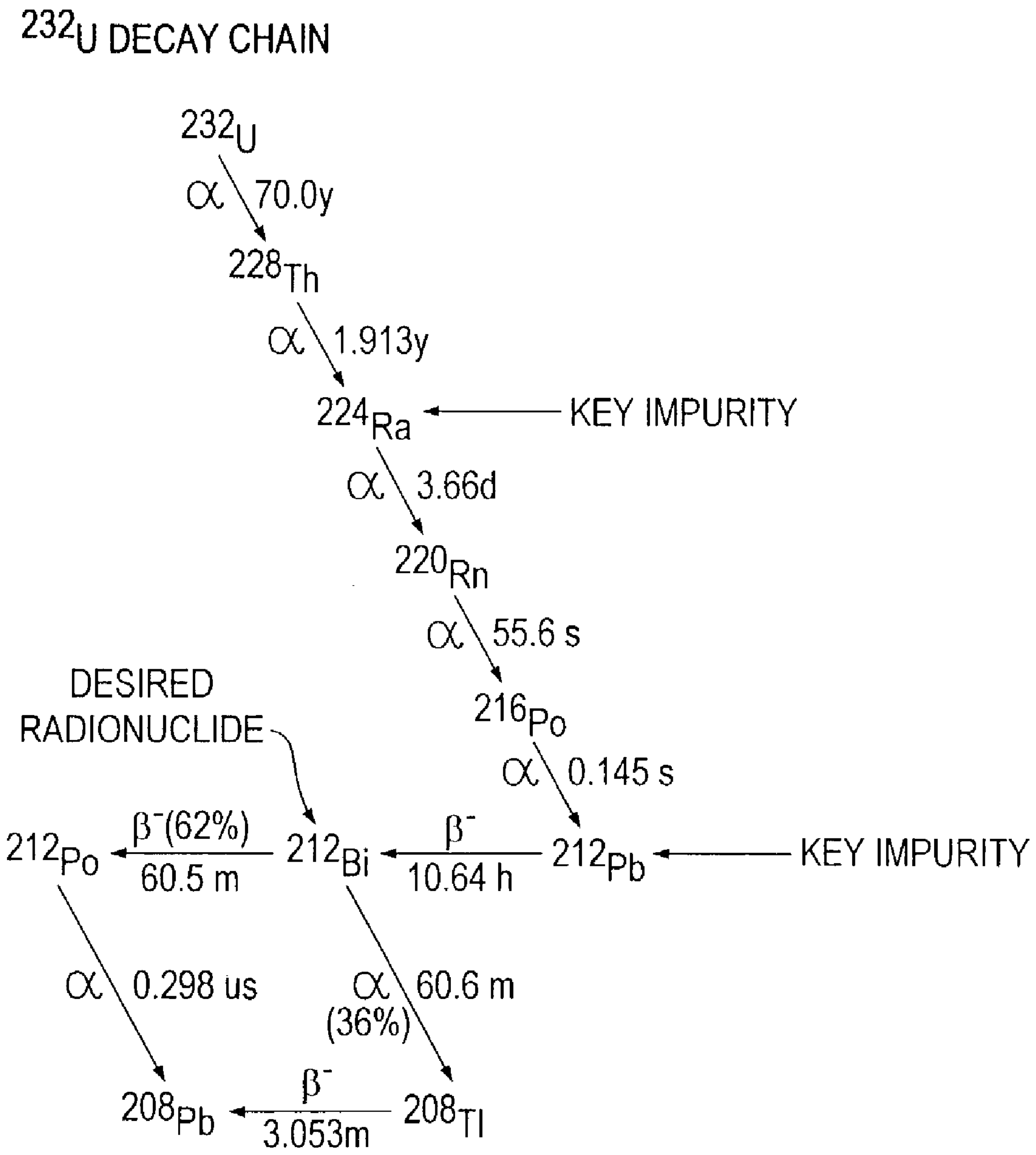
FIG. 4 shows the radioactive decay scheme from $^{232}$U to $^{208}$Pb, highlighting the key impurities (radium and lead nuclides that can interfere with the medical use of the desired radionuclide, $^{212}$Bi) in the development of a multicolumn selectivity inversion generator for $^{212}$Bi.

Examination of the radioactive half-lives shown in FIG. 4 indicates that a solution of $^{224}Ra$ with $t_{1/2}$=3.66 days is well suited to serve as the radionuclidic source material for use in the nuclear pharmacy. The $^{212}Bi$ can be extracted from this solution using a primary separation column selective for Bi(III), while permitting Ra(II), Po(IV), and Pb(II), to elute. In this $^{212}Bi$ example, the most hazardous radionuclidic impurity is the comparatively long-lived bone seeking $^{224}Ra$ parent, with $^{212}Pb$ ($t_{1/2}$=10.64 h) representing somewhat less of a concern.

Figure 5:
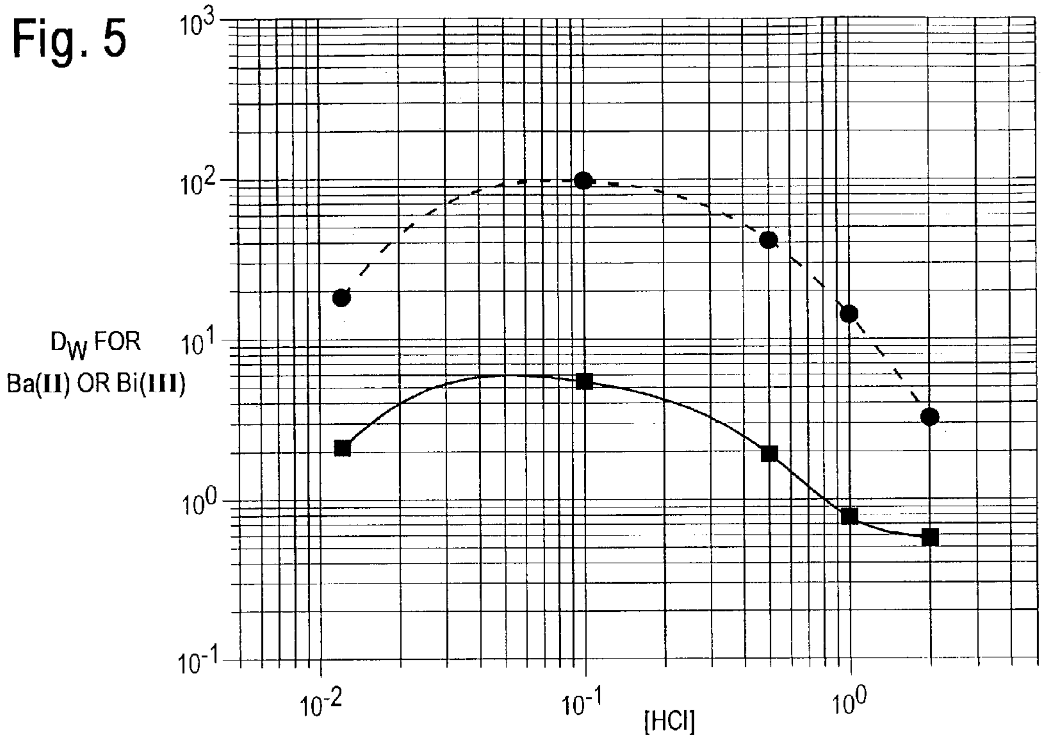
FIG. 5 is a graph that plots dry weight distribution ratios, $D_w$, for Ba(II) [open squares] and Bi(III) [open circles] vs. [HCl] in molarity on a TOPO Resin primary separation column.

The behavior of Ra(II) can be extrapolated from studies using its lighter congener Ba(II), and this chemical analogy has been employed in the discussion below. FIG. 5 shows a plot of $D_w$ for Ba(II) and Bi(III) vs. [HCl] on TOPO Resin, an extraction chromatographic material containing 0.25 M tri-n-octylphosphine oxide (TOPO) in n-dodecane at 20 percent loading on 50–100 μm Amberchrom-CG71.

This plot indicates the potential of TOPO Resin for Bi(III) separation from Ba(II) and, by extension from their chemical similarities, Ra(II), in the range 0.04–0.4 M HCl. Note that values of $D_w$ less than 10 obtained from these batch contact studies indicate essentially no sorption of a given analyte (i.e., Ba(II), and by extension Ra(II), would not be substantially retained under chromatographic elution conditions). Operating in a chromatographic mode, rather than in the batch mode used to generate the data in FIG. 5, DFs of greater than $10^3$ for Ba(II) (and Ra(II)) from Bi(III) can be achieved.

FIG. 5 also shows that $D_w$ for Bi(III) decreases at both extremes of the HCl concentration, which indicates that an HCl concentration greater than 1 M or a pH=3–10 buffered strip solution can serve as effective stripping agents. Because of the proposed in vivo use of the radionuclide and the need for its conjugation to a biolocalization agent, near physiological pH values are preferred as a strongly acidic medium inhibits the conjugation reaction and can chemically attack the biolocalization agent.

A chromatographic study was performed to assess the effectiveness of stripping at low acid concentrations; specifically stripping with a solution of sodium acetate (NaOAc) at pH=6.5. The chromatographic separation of Ba(II) from Bi(III) using modified TRPO Resin (closely related to the phosphine oxide-containing TOPO Resin) is shown in FIG. 6, and the principle of using NaOAc at near-neutral pH to strip Bi(III) from TRPO Resin is confirmed.

Figure 6:
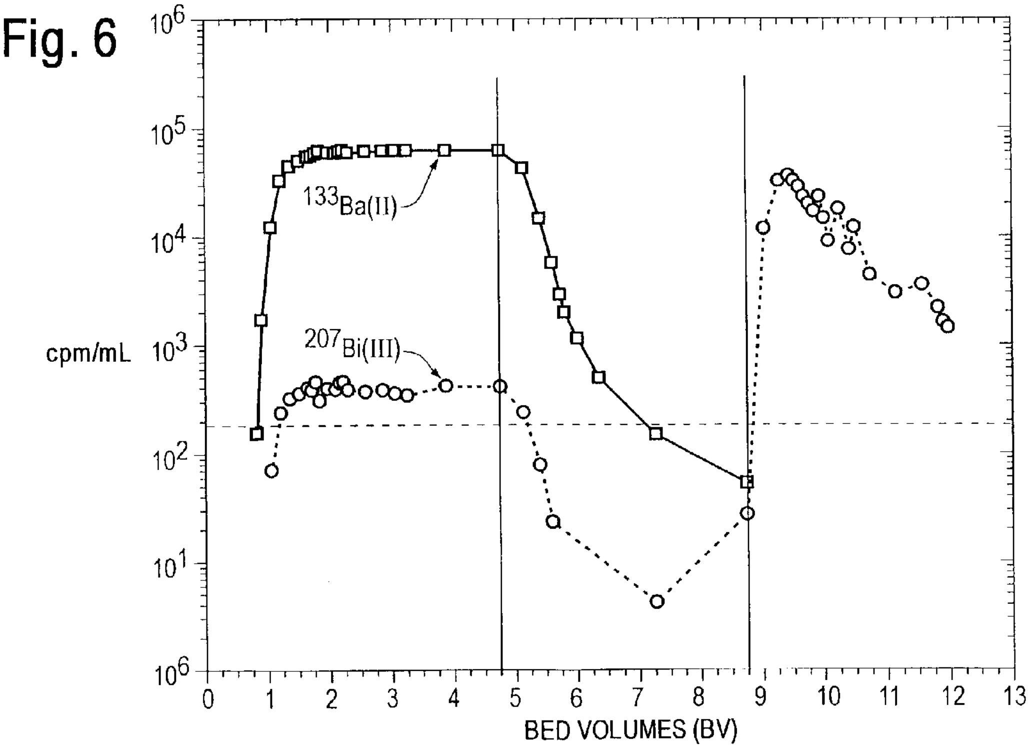
FIG. 6 is a graph of counts per minute per milliliter (cpm/mL) of eluate versus bed volumes (BV) of eluate passed through a column at 25(±2)° C. during the loading (0.75–4.75 BV), rinsing (4.75–8.75 BV), and stripping (8.75–12.25 BV) procedures in the separation of Ba(II) [open squares] from Bi(III) [open circles] by TRPO Resin using 0.20 M HCl as the preequilibration, load, and rinse solutions and 1.0 M NaOAc in 0.20 M NaCl as a strip solution. The horizontal dashed line indicates background counts. No $^{133}$Ba(II) was observed in the range 8.75–12.25 BV after a spilldown correction.

FIG. 6 shows that Ba(II) elutes with the first free column volume of 0.20 M HCl load solution (as predicted for $D_w$ less than 10 from FIG. 5), and decreases steadily to background levels after approximately two bed volumes of 0.20 M HCl rinse. A small amount of $^{207}Bi(III)$ is detected in the column eluate during loading, but is not statistically significant at less than twice background radiation levels in the $^{207}Bi$ window. No $^{133}Ba(II)$ could be detected in the strip solution comprising 1.0 M NaOAc in 0.20 M NaCl, which effectively removes greater than 85 percent of the Bi(III) in approximately two bed volumes. This study confirms that the Bi(III) can be effectively separated from Ba(II) and stripped from the modified TRPO and TOPO Resins by reducing the acid concentration from pH=0.70 (for 0.20 M HCl) to pH=6.5 (1.0 M NaOAc).

The chromatogram of FIG. 6 shows that the TRPO Resin affords a DF of Ba(II) (and Ra(II)) from Bi(III) of about $10^3$, and that this resin could serve as an effective primary separation column in a multicolumn selectivity inversion generator. To ensure a high purity product and to minimize the probability of the $^{224}Ra$ and $^{212}Pb$ parents from reaching the patient; however, a guard column was developed that permits elution of $^{212}Bi(III)$ while $^{224}Ra(II)$ and $^{212}Pb(II)$ are retained.

Figure 7:
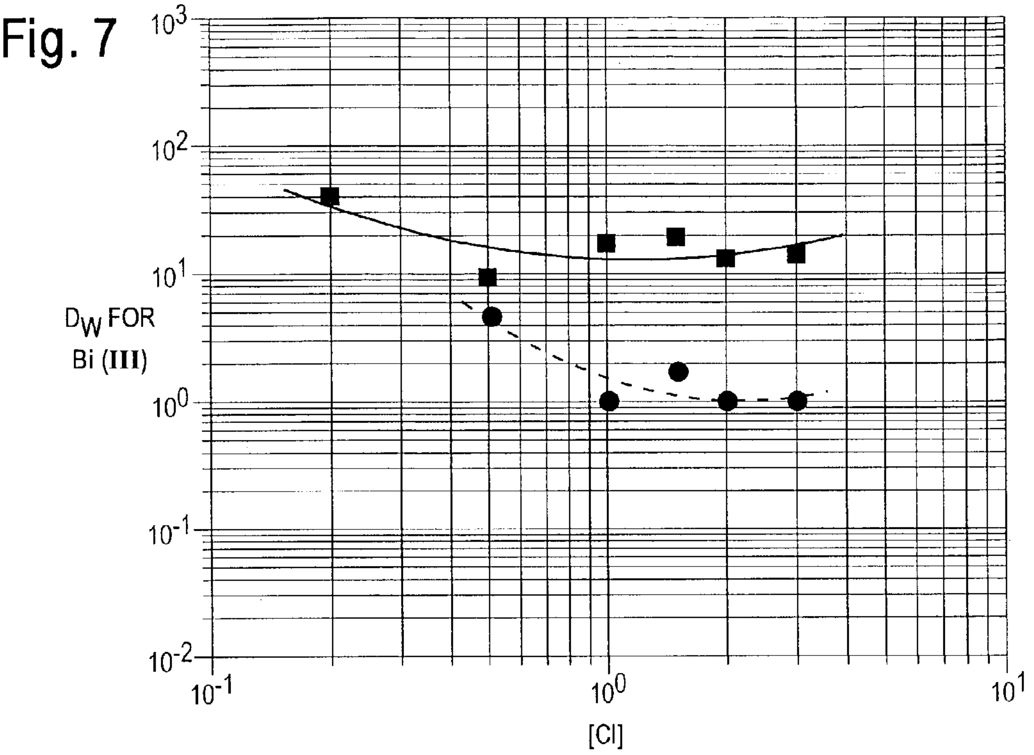
FIG. 7 is a graph that shows $D_w$ values for Bi(III) vs. [$Cl^{1-}$] in molarity for a sulfonic acid cation-exchange resin guard column in a 1.0 M sodium acetate/sodium chloride solution at pH 6.5 [closed squares] versus a solution of 0.0122 M HCl at pH 1.9 [closed circles].

FIG. 7 shows the dependence of Bi(III) uptake on a macroporous sulfonic acid cation-exchange resin vs. $[Cl^{1-}]$ at two different pH values. A $Cl^{1-}$ concentration of about 1 M affords anionic chloro complexes of Bi(III) (e.g., $BiCl_4^{1-}$, $BiCl_5^{2-}$, etc.) that are not retained by cation-exchange resins. As a result, the $D_w$ values for Bi(III) shown in FIG. 7 are quite low, suggesting little, if any, retention of the anionic chloro complexes of Bi(III) under chromatographic conditions. The retention of Ra(II) by sulfonic acid cation-exchange resins in this pH range is reported to be quite high [see, Massart, "Nuclear Science Series, Radiochemical Techniques: Cation-Exchange Techniques in Radiochemistry," NAS-NS 3113; National Academy of Sciences, (1971)], which suggests that $^{224}$Ra(II) would not elute from a cation-exchange resin guard column and would not contaminate the $^{212}$Bi(III) eluate to any significant extent.

The extraction of Pb(II) from solutions of less than 1 M HCl by neutral organophosphorus extractants similar to those used in the TOPO and TRPO Resins of the primary separation column is reported to be quite low. [See, Sekine et al., Solvent Extraction Chemistry, Marcel Dekker, New York (1977).] The proposed cation-exchange resin guard column of FIG. 7 provides additional decontamination from $^{212}$Pb(II) based on the observation that Pb(II) does not form anionic chloro complexes to any appreciable extent at [$Cl^-$] less than 1 M. Supporting this observation are experimental results reporting that $^{212}$Bi(III), substantially free of its immediate $^{212}$Pb(II) parent, can be eluted from sulfonic acid cation-exchange resins by 0.5 M HCl (i.e., Pb(II) is retained by the cation-exchange resin under these conditions). [See, Hassfjell et al., *Chem. Rev.* 101:2019–2036 (2001); Mirzadeh et al., *J. Radioanal. Nucl. Chem.* 203:471–488 (1996); and Mirzadeh,. *Appl. Radiat. Isot.* 49:345–349 (1998).] The data presented in FIGS. 5–7 combined with the literature data for Pb(II) indicate that $^{212}$Bi can be effectively separated from its $^{224}$Ra and $^{212}$Pb parents using a multicolumn selectivity inversion generator based on a neutral organophosphorus extractant primary separation column.

Figure 8:
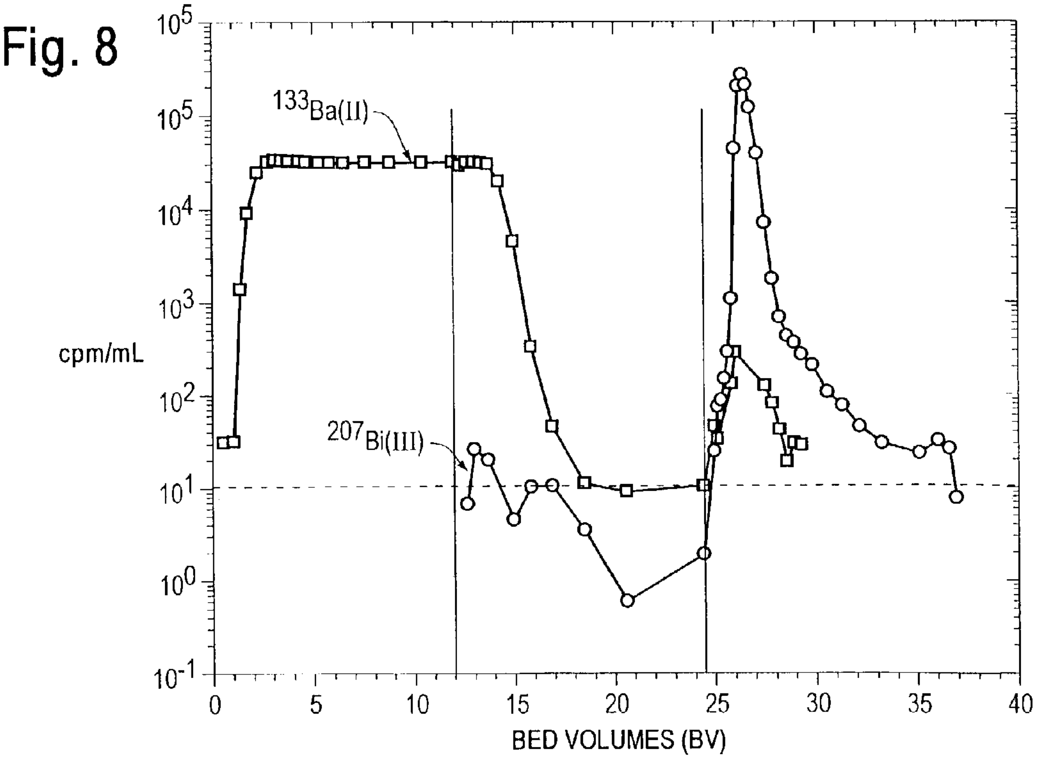
FIG. 8 is a graph of counts per minute per milliliter (cpm/mL) of eluate versus bed volumes (BV) of eluate passed through a column at 25(±2)° C. during the loading (1–12 BV), rinsing (12–24.5 BV), and stripping procedures (24.5–37 BV) in the separation of Ba(II) [open squares] from Bi(III) [open circles] by Dipex® Resin using 1.0 M $HNO_3$ as the preequilibration, load, and rinse solutions and 2.0 M HCl as a strip solution. The horizontal dashed line indicates background counts. No $^{207}$Bi(III) was detected during loading. Counts from $^{133}$Ba(II) reached background levels after passage of 30 BV.

FIG. 8 presents an alternative to the modified TRPO Resin primary separation column (FIG. 6) for the separation of $^{212}$Bi(III) from $^{224}$Ra(II) and $^{212}$Pb(II). Dipex® Resin is an extraction chromatographic material consisting of 40 percent loading of P,P'-bis(2-ethylhexyl)methanediphosphonic acid on 20–50 μm Amberchrom-CG71. [See, Horwitz et al., *React. Funct. Polymers* 33:25–36 (1997).] FIG. 8 shows that Bi(III) is strongly retained from 1.0 M $HNO_3$ by Dipex® Resin, while Ba(II) readily elutes. No statistically significant quantities of $^{207}$Bi(III) were detected during the load and rinse procedures, and the 1.0 M $HNO_3$ rinse brought the $^{133}$Ba(II) levels to background after five bed volumes. Stripping with 2.0 M HCl removes greater than 93 percent of the $^{207}$Bi(III) along with a minimal amount of $^{133}$Ba(II) in two bed volumes. Use of the chelating ion-exchange Dipex® Resin in the primary separation column affords overall DFs of greater than $10^3$, but would still require the use of guard column chemistry as described above to minimize the potential for contamination of the $^{212}$Bi product by $^{224}$Ra and $^{212}$Pb.

Each of the patents, applications and articles cited herein is incorporated by reference. The use of the article "a" or "an" is intended to include one or more.

From the foregoing it will be observed that numerous modifications and variations can be effectuated without departing from the true spirit and scope of the novel concepts of the invention. It is to be understood that no limitation with respect to the specific embodiment illustrated is intended or should be inferred. The disclosure is intended to cover by the appended claims all such modifications as fall within the scope of the claims.

What is claimed:

1. A method for producing a solution of desired daughter radionuclide that is substantially free of impurities comprising the steps of:

(a) contacting an aqueous parent-daughter solution containing a desired daughter radionuclide with a first separation medium having a high affinity for the desired daughter radionuclide and a low affinity for the parent and other daughter radionuclides, said desired daughter and parent radionuclides having different (i) ionic charges, (ii) charge densities or (iii) both as they are present in said solution, and maintaining that contact for a time period sufficient for said desired daughter radionuclide to be bound by the first separation medium to form desired daughter-laden separation medium and a desired daughter-depleted parent-daughter solution;

(b) removing the desired daughter-depleted parent daughter solution from the separation medium;

(c) stripping the desired daughter radionuclide from the desired daughter-laden separation medium to form a solution of desired daughter radionuclide;

(e) contacting the solution of desired daughter radionuclide with a second separation medium having a high affinity for the parent radionuclide and a low affinity for said desired daughter radionuclide, and maintaining that contact for a time period sufficient for said parent radionuclide to be bound by the second separation medium to form a solution of substantially impurity-tree desired daughter radionuclide.

2. The method according to claim 1 wherein said desired daughter and parent radionuclides have different ionic charges.

3. The method according to claim 1 wherein said desired daughter and parent radionuclides have different charge densities.

4. The method according to claim 1 wherein said desired daughter and parent radionuclides have both different ionic charges and charge densities.

5. The method according to claim 1 wherein the decontamination factor of the desired daughter radionuclide from the parent radionuclide impurities of said first separation medium under the conditions of contact is greater than or equal to $10^2$.

6. The method according to claim 1 wherein the decontamination factor of the desired daughter radionuclide from the parent radionuclide impurities of said second separation medium under the conditions of contact is greater than or equal to $10^2$.

7. A method for producing a solution of desired daughter radionuclide that is substantially free of impurities comprising the steps of:

(a) providing an aqueous parent-daughter radionuclide solution containing a desired daughter radionuclide;

(b) contacting the parent-daughter solution with a first separation medium having a high affinity for the desired daughter radionuclide and a low affinity for the parent and other daughter radionuclides such that the decontamination factor of the desired daughter radionuclide from the parent radionuclide impurities of said first separation medium under the conditions of contact is greater than or equal to $10^2$, said desired daughter and parent radionuclides having different (i) ionic charges, (ii) charge densities or (iii) both as they are present in said solution, and maintaining that contact for a time period sufficient for said desired daughter radionuclide to be bound by the first separation medium to form desired daughter-laden separation medium and a desired daughter-depleted parent-daughter solution;

(c) removing the desired daughter-depleted parent daughter solution from the separation medium;

(d) stripping the desired daughter radionuclide from the desired daughter-laden separation medium to form a solution of desired daughter radionuclide;

(e) contacting the solution of desired daughter radionuclide with a second separation medium having a high affinity for the parent radionuclide and a low affinity for said desired daughter radionuclide such that the decontamination factor of the desired daughter radionuclide from the parent radionuclide impurities of said first separation medium under the conditions of contact is greater than or equal to $10^2$, and maintaining that contact for a time period sufficient for said parent radionuclide to be bound by the second separation medium to form a solution of substantially impurity-free desired daughter radionuclide.

8. The method according to claim 7 wherein the combined decontamination factor of the desired daughter radionuclide from the parent radionuclide impurities for both the first and second separation media is about $10^4$ to about $10^{10}$.

9. The method according to claim 7 wherein said desired daughter and parent radionuclides have different ionic charges.

10. The method according to claim 7 wherein said desired daughter and parent radionuclides have different charge densities.

11. The method according to claim 7 wherein said desired daughter and parent radionuclides have both different ionic charges and charge densities.

12. The method according to claim 7 wherein said desired daughter radionuclide is selected from the group consisting of $^{90}$Y, $^{99m}$Tc, $^{103}$Pd, $^{111}$In, $^{125}$I, $^{188}$Re, $^{201}$Tl, $^{47}$Sc, $^{212}$Bi, $^{213}$Bi, $^{211}$At, and $^{223}$Ra.

13. A method for producing a solution of desired daughter radionuclide that is substantially free of impurities comprising the steps of:

(a) providing an aqueous parent-daughter radionuclide solution containing a desired daughter radionuclide that is selected from the group consisting of $^{90}$Y, $^{99m}$Tc, $^{103}$Pd, $^{111}$In, $^{125}$I, $^{188}$Re, $^{201}$Tl, $^{47}$Sc, $^{212}$Bi, $^{213}$Bi, $^{211}$At, and $^{223}$Ra;

(b) contacting the parent-daughter solution with a first separation medium having a high affinity for the desired daughter radionuclide and a low affinity for the parent and other daughter radionuclides such that the decontamination factor of the desired daughter radionuclide from the parent radionuclide impurities of said first separation medium under the conditions of contact is greater than or equal to $10^2$, said desired daughter and parent radionuclides having different ionic charges as they are present in said solution, and maintaining that contact for a time period sufficient for said desired daughter radionuclide to be bound by the first separation medium to form desired daughter-laden separation medium and a desired daughter-depleted parent-daughter solution;

(c) removing the desired daughter-depleted parent daughter solution from the separation medium;

(d) stripping the desired daughter radionuclide from the desired daughter-laden separation medium to form a solution of desired daughter radionuclide;

(e) contacting the solution of desired daughter radionuclide with a second separation medium having a high affinity for the parent radionuclide and a low affinity for said desired daughter radionuclide such that the decontamination factor of the desired daughter radionuclide from the parent radionuclide impurities of said first separation medium under the conditions of contact is greater than or equal to $10^2$, and maintaining that contact for a time period sufficient for said parent radionuclide to be bound by the second separation medium to form a solution of substantially impurity-free desired daughter radionuclide.

14. The method according to claim 13 wherein the combined decontamination factor of the desired daughter radionuclide from the parent radionuclide impurities for both the first and second separation media is about $10^4$ to about $10^{10}$.

15. A method for producing a solution of desired daughter radionuclide that is substantially free of impurities comprising the steps of:

(a) providing an aqueous parent-daughter radionuclide solution containing a desired daughter radionuclide that is selected from the group consisting of $^{90}$Y, $^{99m}$Tc, $^{103}$Pd, $^{111}$In, $^{125}$I, $^{188}$Re, $^{201}$Tl, $^{47}$Sc, $^{212}$Bi, $^{213}$Bi, $^{211}$At, and $^{223}$Ra;

(b) contacting the parent-daughter solution with a first separation medium having a high affinity for the desired daughter radionuclide and a low affinity for the parent and other daughter radionuclides such that the decontamination factor of the desired daughter radionuclide from the parent radionuclide impurities of said first separation medium under the conditions of contact is greater than or equal to $10^2$, said desired daughter and parent radionuclides having different charge densities as they are present in said solution, and maintaining that contact for a time period sufficient for said desired daughter radionuclide to be bound by the first separation medium to form desired daughter-laden separation medium and a desired daughter-depleted parent-daughter solution;

(c) removing the desired daughter-depleted parent daughter solution from the separation medium;

(d) stripping the desired daughter radionuclide from the desired daughter-laden separation medium to form a solution of desired daughter radionuclide;

(e) contacting the solution of desired daughter radionuclide with a second separation medium having a high affinity for the parent radionuclide and a low affinity for said desired daughter radionuclide such that the decontamination factor of the desired daughter radionuclide from the parent radionuclide impurities of said first separation medium under the conditions of contact is greater than or equal to $10^2$, and maintaining that contact for a time period sufficient for said parent radionuclide to be bound by the second separation medium to form a solution of substantially impurity-free desired daughter radionuclide.

16. The method according to claim 15 wherein the combined decontamination factor of the desired daughter radionuclide from the parent radionuclide impurities for both the first and second separation media is about $10^4$ to about $10^{10}$.

17. The method according to claim 15 wherein the desired daughter radionuclide is $^{212}$Bi(III).

18. The method according to claim 17 wherein one parent radionuclide is $^{224}$Ra(II).

19. A method for producing a solution of desired daughter radionuclide that is substantially free of impurities comprising the steps of:

(a) providing an aqueous parent-daughter radionuclide solution containing a desired daughter radionuclide that is selected from the group consisting of $^{90}$Y, $^{99m}$Tc, $^{103}$Pd, $^{111}$In, $^{125}$I, $^{188}$Re, $^{201}$Tl, $^{47}$Sc, $^{212}$Bi, $^{213}$Bi, $^{211}$At, and $^{223}$Ra;

(b) contacting the parent-daughter solution with a first separation medium having a high affinity for the desired daughter radionuclide and a low affinity for the parent and other daughter radionuclides such that the decontamination factor of the desired daughter radionuclide from the parent radionuclide impurities of said first separation medium under the conditions of contact is greater than or equal to $10^2$, said desired daughter and parent radionuclides having both different ionic charges and charge densities as they are present in said solution, and maintaining that contact for a time period sufficient for said desired daughter radionuclide to be bound by the first separation medium to form desired daughter-laden separation medium and a desired daughter-depleted parent-daughter solution;

(c) removing the desired daughter-depleted parent daughter solution from the separation medium;

(d) stripping the desired daughter radionuclide from the desired daughter-laden separation medium to form a solution of desired daughter radionuclide;

(e) contacting the solution of desired daughter radionuclide with a second separation medium having a high affinity for the parent radionuclide and a low affinity for said desired daughter radionuclide such that the decontamination factor of the desired daughter radionuclide from the parent radionuclide impurities of said first separation medium under the conditions of contact is greater than or equal to $10^2$, and maintaining that contact for a time period sufficient for said parent radionuclide to be bound by the second separation medium to form a solution of substantially impurity-free desired daughter radionuclide.

20. The method according to claim 17 wherein the combined decontamination factor of the desired daughter radionuclide from the parent radionuclide impurities for both the first and second separation media is about $10^4$ to about $10^{10}$.

* * * * *